United States Patent
Wang et al.

(10) Patent No.: US 11,222,350 B2
(45) Date of Patent: Jan. 11, 2022

(54) SERVICE PROCESSING METHOD AND APPARATUS, AND ELECTRONIC DEVICE

(71) Applicant: ADVANCED NEW TECHNOLOGIES CO., LTD., Grand Cayman (KY)

(72) Inventors: Fengwei Wang, Hangzhou (CN); Huimei He, Hangzhou (CN); Yu Qu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 17/084,744

(22) Filed: Oct. 30, 2020

(65) Prior Publication Data
US 2021/0049633 A1 Feb. 18, 2021

Related U.S. Application Data

(63) Continuation of application No. PCT/CN2019/091756, filed on Jun. 18, 2019.

(30) Foreign Application Priority Data

Aug. 6, 2018 (CN) .......................... 201810887465.1

(51) Int. Cl.
*G06Q 20/24* (2012.01)
*G06Q 30/02* (2012.01)
(Continued)

(52) U.S. Cl.
CPC ....... *G06Q 30/0213* (2013.01); *G06Q 20/102* (2013.01); *G06Q 20/24* (2013.01); *G06Q 20/387* (2013.01); *H04M 15/854* (2013.01)

(58) Field of Classification Search
None
See application file for complete search history.

(56) References Cited

U.S. PATENT DOCUMENTS

| | | | |
|---|---|---|---|
| 7,275,046 B1 | 9/2007 | Tritt et al. | |
| 7,734,501 B2 * | 6/2010 | Hahn | ................. G06Q 30/0215 705/14.17 |

(Continued)

FOREIGN PATENT DOCUMENTS

| | | |
|---|---|---|
| CN | 1754183 A | 3/2006 |
| CN | 102609857 A | 7/2012 |

(Continued)

OTHER PUBLICATIONS

Huailiang Tan, Lianjun Huang, Zaihong He, Youyou Lu, Xubin He, "I/O bandwidth dynamic allocation method for virtual networks", Journal of Network and Computer Applications 39 (2014) 104-116, journal homepage: www.elsevier.com/locate/jnca, pp. 104-115 (Year: 2014).*

(Continued)

*Primary Examiner* — Christopher Bridges
*Assistant Examiner* — Tony P Kanaan

(57) ABSTRACT

Methods, apparatuses, and devices for processing a service, including computer programs encoded on computer storage media are provided. One of the methods includes: receiving an application sent from a user terminal of a first user comprising a commitment; verifying a credit value of the first user; in response to the credit value reaching a predetermined credit value, accepting the application of the first user; and in response to the first user failing to fulfill the commitment, triggering a balance compensation process to cause the first user to send a balance resource to the second user by a deadline.

18 Claims, 8 Drawing Sheets

(51) Int. Cl.
*G06Q 20/10* (2012.01)
*G06Q 20/38* (2012.01)
*H04M 15/00* (2006.01)

(56) References Cited

U.S. PATENT DOCUMENTS

| | | |
|---|---|---|
| 7,792,748 B1 | 9/2010 | Ebersole et al. |
| 8,380,591 B1* | 2/2013 | Kazenas ................ G06Q 20/14 |
| | | 705/30 |
| 8,667,057 B1 | 3/2014 | Adya et al. |
| 9,984,372 B1* | 5/2018 | Elrod ..................... G06Q 20/28 |
| 10,692,056 B1* | 6/2020 | Garner, IV ........... G06Q 20/102 |
| 10,692,147 B1 | 6/2020 | Ruble |
| 2001/0051919 A1* | 12/2001 | Mason .................... G06Q 20/10 |
| | | 705/40 |
| 2008/0077506 A1* | 3/2008 | Rampell ................ G06Q 30/06 |
| | | 705/26.1 |
| 2008/0082643 A1 | 4/2008 | Storrie et al. |
| 2008/0249936 A1* | 10/2008 | Miller .................... G06Q 20/38 |
| | | 705/40 |
| 2010/0217706 A1* | 8/2010 | Griffin ................. G06Q 20/102 |
| | | 705/40 |
| 2010/0223184 A1 | 9/2010 | Perlman |
| 2010/0257102 A1 | 10/2010 | Perlman |
| 2011/0137740 A1 | 6/2011 | Bhattacharya et al. |
| 2011/0178902 A1* | 7/2011 | Imrey .................... G06Q 40/00 |
| | | 705/30 |
| 2013/0155854 A1* | 6/2013 | Andreoli-Fang ..... H04L 47/765 |
| | | 370/230 |
| 2013/0297473 A1 | 11/2013 | Wolfe |
| 2013/0339188 A1 | 12/2013 | Mohamed et al. |
| 2014/0067654 A1 | 3/2014 | Hanson et al. |
| 2014/0101057 A1 | 4/2014 | Oliver et al. |
| 2014/0324683 A1 | 10/2014 | Sivaraman |
| 2015/0039388 A1* | 2/2015 | Rajaraman ......... G06Q 30/0222 |
| | | 705/7.29 |
| 2015/0170130 A1 | 6/2015 | Patel et al. |
| 2016/0217532 A1 | 7/2016 | Slavin |
| 2016/0307245 A1* | 10/2016 | Lutnick ................ G06Q 20/102 |
| 2016/0359968 A1* | 12/2016 | Chitti .................. H04L 41/0896 |
| 2017/0004463 A1* | 1/2017 | Stroeh .................. G06Q 20/102 |
| 2017/0195994 A1 | 7/2017 | Cole et al. |
| 2017/0200158 A1* | 7/2017 | Honey ................... G06Q 20/24 |
| 2017/0302505 A1* | 10/2017 | Zafer ...................... H04L 69/40 |
| 2018/0189498 A1 | 7/2018 | Boutnaru |
| 2019/0038133 A1 | 2/2019 | Tran |
| 2019/0378137 A1* | 12/2019 | Honey ................... G06Q 20/24 |

FOREIGN PATENT DOCUMENTS

| | | |
|---|---|---|
| CN | 104205148 A | 12/2014 |
| CN | 105303400 A | 2/2016 |
| CN | 106960357 A | 7/2017 |
| CN | 107622412 A | 1/2018 |
| CN | 108109027 A | 6/2018 |
| CN | 109146600 A | 1/2019 |
| CN | 109272342 A | 1/2019 |
| CN | 109583998 A | 4/2019 |
| JP | 2002-352333 A | 12/2002 |
| KR | 10-2006-0039065 A | 5/2006 |
| KR | 10-2006-0059666 A | 6/2006 |
| KR | 10-0800420 B1 | 2/2008 |
| KR | 10-2013-0017042 A | 2/2013 |
| TW | 200517908 A | 6/2005 |
| ZA | 200600622 B | 3/2007 |

OTHER PUBLICATIONS

Written Opinion and International Search Report for PCT Application No. PCT/CN2019/091756 dated Aug. 27, 2020.
First Search for Chinese Application No. 201810887465.1 dated Jan. 9, 2020.
Office Action for Korean Application No. 10-2020-7034237 dated May 7, 2021.
International Preliminary Report on Patentability Chapter I for PCT Application No. PCT/CN2019/091756 dated Feb. 18, 2021.
Search Report for Taiwanese Application No. 108119713 dated Jul. 15, 2021.
Office Action for Japanese Application No. 2020-564424 dated Jul. 12, 2021.

* cited by examiner

SERVICE PROCESSING METHOD AND APPARATUS, AND ELECTRONIC DEVICE

CROSS-REFERENCE TO RELATED APPLICATIONS

The present application is a continuation application of International Application No. PCT/CN2019/091756, filed on Jun. 18, 2019, which claims priority and the benefit of the Chinese Patent Application No. 201810887465.1 filed with China National Intellectual Property Administration (CNIPA) of the People's Republic of China on Aug. 6, 2018. The entire contents of the above-recognized applications are incorporated herein by reference.

TECHNICAL FIELD

The specification relates to the field of service processing and, in particular, to a method, an apparatus and an electronic device for processing a service.

BACKGROUND

Service processing often involves various service interaction scenarios. With a network data sharing scenario as an example, different users can share their own network data with one another. For example, a first user may set a standard amount resources for network data to be available for sharing. Thereby any other user has to share an amount of network data corresponding to the standard amount resources to obtain a corresponding network data from the first user. In this way, long-term, sustainable sharing can be maintained between the users, helping increasing data sharing activities.

SUMMARY

In view of this, one or more embodiments described herein provide methods, apparatuses, and electronic devices for processing a service.

In a first aspect, the specification provides a method for processing a service, which includes:

receiving information sent from a user terminal, the information comprising: when a credit value of a first user corresponding to the user terminal reaches a predetermined value, if the first user makes a commitment to sending no less than a predetermined amount of resources to a second user within a predetermined period of time, then a ratio of the amount of resources sent by the first user to a standard amount of resources corresponding to a service object provided by the second user to the first user is defined as a first ratio a, where $0<a<1$; and triggering a balance compensation process, if an actual amount of resources sent by the first user to the second user within the predetermined period of time is less than the predetermined amount, to cause the first user to send a balance resource to the second user by a deadline, wherein a ratio of an amount of the balance resource to the standard amount of resources is defined as a second ratio b, where $0<b \leq 1-a$.

In a second aspect, the specification provides a method for processing a service, which includes:

receiving information sent from a user terminal, the information comprising: when a first user corresponding to the user terminal has at least one associated user and a credit value of each of the first and associated users reaches a predetermined value, if the first and associated users make commitments to sending no less than a predetermined amount of total resources to the second user within a predetermined period of time, then a ratio of an amount of resources sent by the first user to a standard amount of resources corresponding to a service object provided by the second user to the first user is defined as a first ratio a, where $0<a<1$; and triggering a balance compensation process, if an actual total amount of resources delivered by the first and associated users to the second user within the predetermined period of time is less than the predetermined amount, to cause the first user to send a balance resource to the second user by a deadline, wherein a ratio of an amount of the balance resource to the standard amount of resources is defined as a second ratio b, where $0<b \leq 1-a$.

In a third aspect, the specification provides an apparatus for processing a service, which includes:

a receiving unit for receiving information sent from a user terminal, the information comprising: when a credit value of a first user corresponding to the user terminal reaches a predetermined value, if the first user makes a commitment to sending no less than a predetermined amount of resources to a second user within a predetermined period of time, then a ratio of an amount of resources sent by the first user to a standard amount of resources corresponding to a service object provided by the second user to the first user is defined as a first ratio a, where $0<a<1$; and a first triggering unit for triggering a balance compensation process, if an actual amount of resources sent by the first user to the second user within the predetermined period of time is less than the predetermined amount, to cause the first user to send a balance resource to the second user by a deadline, wherein a ratio of an amount of the balance resource to the standard amount of resources is defined as a second ratio b, where $0<b \leq 1-a$.

In a fourth aspect, the specification provides an apparatus for processing a service, which includes:

a receiving unit for receiving information sent from a user terminal, the information comprising: when a first user corresponding to the user terminal has at least one associated user and a credit value of each of the first and associated users reaches a predetermined value, if the first and associated users make commitments to sending no less than a predetermined amount of total resources to the second user within a predetermined period of time, then a ratio of an amount of resources sent by the first user to a standard amount of resources corresponding to a service object provided by the second user to the first user is defined as a first ratio a, where $0<a<1$; and a triggering unit for triggering a balance compensation process, if an actual total amount of resources sent by the first and associated users to the second user within the predetermined period of time is less than the predetermined amount, to cause the first user to send a balance resource to the second user by a deadline, wherein a ratio of an amount of the balance resource to the standard amount of resources is defined as a second ratio b, where $0<b \leq 1-a$.

In a fifth aspect, the specification provides an electronic device, which includes:

a processor; and a storage device for storing processor-executable instructions, wherein the processor is configured to execute the executable instructions to implement the method according to the above first aspect.

In a sixth aspect, the specification provides an electronic device, which includes:

a processor; and a storage device for storing processor-executable instructions, wherein the processor is configured to execute the executable instructions to implement the method according to the above second aspect.

In another aspect, the specification provides a computer-implemented method for processing a service. The method may include: receiving an application from a user terminal of a first user, the application comprising a commitment that the first user sends no less than a predetermined amount of resources to a second user within a predetermined period of time, to obtain a service object from the second user at a first ratio a, wherein the first ratio a is a ratio of an amount of resources sent by the first user to a standard amount of resources corresponding to the service object, and $0<a<1$; verifying a credit value of the first user; in response to the credit value reaching a predetermined credit value, accepting the application of the first user; and in response to the first user failing to fulfill the commitment, triggering a balance compensation process to cause the first user to send a balance resource to the second user at a second ratio b by a deadline, wherein the second ratio b is a ratio of an amount of the balance resource to the standard amount of resources, and $0<b\leq 1-a$.

In yet another aspect, the specification provides an apparatus for processing a service. The apparatus may include one or more processors and a non-transitory computer-readable memory coupled to the one or more processors and configured with instructions executable by the one or more processors to perform operations. The operations may include: receiving an application from a user terminal of a first user, the application comprising a commitment that the first user sends no less than a predetermined amount of resources to a second user within a predetermined period of time, to obtain a service object from the second user at a first ratio a, wherein the first ratio a is a ratio of an amount of resources sent by the first user to a standard amount of resources corresponding to the service object, and $0<a<1$; verifying a credit value of the first user; in response to the credit value reaching a predetermined credit value, accepting the application of the first user; and in response to the first user failing to fulfill the commitment, triggering a balance compensation process to cause the first user to send a balance resource to the second user at a second ratio b by a deadline, wherein the second ratio b is a ratio of an amount of the balance resource to the standard amount of resources, and $0<b\leq 1-a$.

In still another aspect, the specification provides a non-transitory computer-readable storage medium for processing a service. The non-transitory computer-readable storage may store instructions executable by one or more processors to cause the one or more processors to perform operations. The operations may include: receiving an application from a user terminal of a first user, the application comprising a commitment that the first user sends no less than a predetermined amount of resources to a second user within a predetermined period of time, to obtain a service object from the second user at a first ratio a, wherein the first ratio a is a ratio of an amount of resources sent by the first user to a standard amount of resources corresponding to the service object, and $0<a<1$; verifying a credit value of the first user; in response to the credit value reaching a predetermined credit value, accepting the application of the first user; and in response to the first user failing to fulfill the commitment, triggering a balance compensation process to cause the first user to send a balance resource to the second user at a second ratio b by a deadline, wherein the second ratio b is a ratio of an amount of the balance resource to the standard amount of resources, and $0<b\leq 1-a$.

DETAILED DESCRIPTION

Figure 1:
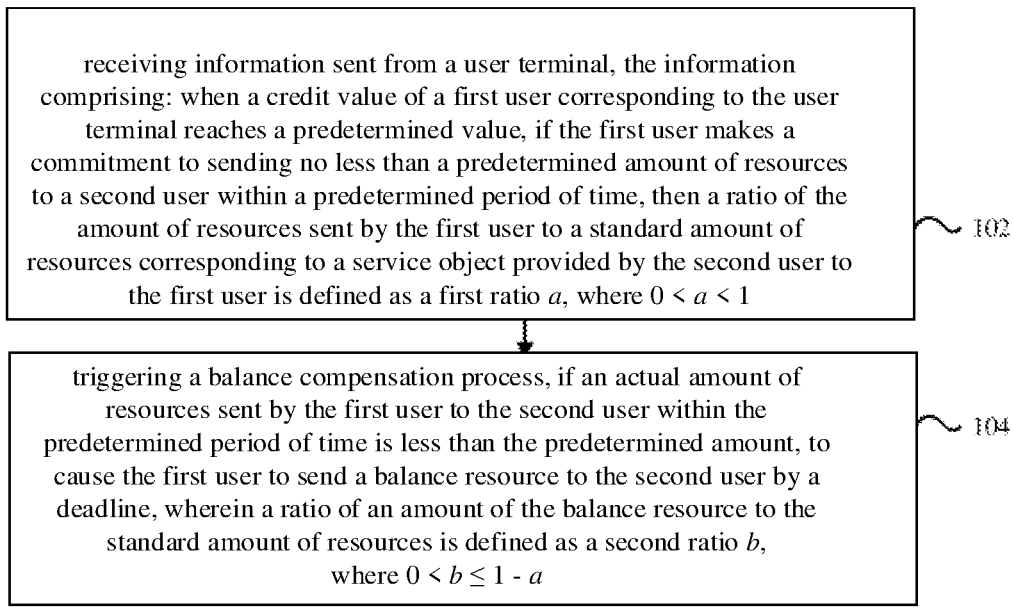
FIG. 1 is a flow diagram of a method for processing a service according to an exemplary embodiment.

Reference will now be made in detail to exemplary embodiments, examples of which are shown in the accompanying drawings. Whenever the drawings are referred to hereinafter, the same reference numerals will be used throughout them to refer to the same or like elements, unless otherwise indicated. The implementations set forth in the following exemplary embodiments do not represent all implementations consistent with the one or more embodiments described herein. Instead, they are merely apparatus and method examples consistent with certain aspects of the one or more embodiments described, as detailed in the appended claims.

It should be noted that, in other embodiments, method steps may not be necessarily carried out in the same order as shown and described herein. In some other embodiments, more or fewer method steps than as described herein may be included. In addition, a single step described herein may be described as multiple divided steps in other embodiments, and multiple steps described herein may be described as one single combined step in other embodiments.

FIG. 1 is a flow diagram of a method for processing a service according to an exemplary embodiment. As shown in FIG. 1, the method is implementable on a service platform and may include the steps as detailed below.

In step 102, receiving information sent from a user terminal. The information comprises: when a credit value of a first user corresponding to the user terminal reaches a predetermined value, if the first user makes a commitment to sending no less than a predetermined amount of resources to a second user within a predetermined period of time, then a ratio of an amount of resources sent by the first user to a standard amount of resources is defined as a first ratio a, where 0<a<1. The standard amount of resources corresponds to a service object provided by the second user to the first user.

In one embodiment, the service platform and the second user may negotiate with each other in advance and enter into an agreement on service rules such as start and end times of the predetermined period of time, a duration of the predetermined period of time, a value of the predetermined amount, a value of the first ratio a, a value of the second ratio b, etc. The first user may review these service rules and, when agreeing upon these service rules, authorize the formation of the above information, and send the formation to the service platform, thereby making the following commitment. The commitment may include that within a predetermined period of time, the first user will pay no less than a predetermined amount of resources to the second user, so that within the same predetermined period of time, the first user can get a corresponding service object from the second user based on the first ratio a instead of paying the standard amount of resources corresponding to the service object.

In one embodiment, in order to ensure that the above commitment is fulfilled or to increase the probability of fulfillment, the service platform may verify the first user's credit status. If the first user's credit value reaches (e.g., being higher than or equal to) the predetermined value, it indicates that the first user has good credit and the commitment of the first user will be accepted so that the first user is qualified for obtaining the service object from the second user at the first ratio a within the predetermined period of time. If the first user's credit value does not reach the predetermined value, it indicates that the first user has poor credit and the commitment of the first user may be rejected so that the first user has to obtain the second user's service object with the standard amount of resources. The credit value may be, without limitation, in the form of a score, a number, a rating or the like.

In one embodiment, the first user's credit value may be retrieved from the service platform itself. That is, the service platform may have user credit assessment capabilities. Alternatively, the credit value may be retrieved from a credit management platform. That is, the service platform may retrieve the credit value from the credit management platform.

According to one embodiment, in a network data sharing scenario, the service platform may be a sharing management platform, and the first user may send the information to the sharing management platform to make a commitment to sharing with the second user network data (i.e., the resources to be sent by the first user to the second user) no less than a predetermined amount within a predetermined period of time, so that when the first user's credit status meets requirements, corresponding network data from the second user (i.e., network data provided by the second user for sharing) at the first ratio a can be obtained. For example, in case of the second user having 1 GB of network data, and based on the principle of equivalent exchange, the corresponding standard amount of resources is set to 1 GB. In general cases, the first user would have to share 1 GB of network data with the second user before getting the second user's same amount of network data. However, if the first user makes a commitment to sharing 20 GB or more (i.e., the predetermined amount) of network data with the second user within 10 days (i.e., the predetermined period of time), indicating that the first user is willing to maintain long-term data sharing with the second user. Then the first user will be qualified for obtaining the second user's network data with a preferential sharing scheme: sharing 0.8 GB to obtain 1 GB (i.e., the first ratio a=80%) within that period of time. This preferential sharing scheme is advantageous in allowing the first user to allocate more of his/her limited network resources such as uplink and downlink bandwidths to obtaining the second user's network data, thus encouraging him/her data sharing activities. Wide application of this commitment-based preferential sharing scheme enables effective sharing of network data in a network environment.

According to one embodiment, in a shopping scenario, the service platform may be a transaction platform, and a buyer user can send the information to the transaction platform to make a commitment to a consumption at the seller user of no less than a predetermined amount (i.e., the resources to be sent by the buyer user to the seller user) within a predetermined period of time, so that when the buyer user's credit status meets requirements, he/she can purchase products from the seller user (i.e., the service object provided by the seller user) at the first ratio a. For example, for the seller user's product H having a marked price of 1,000 Yuan, that is, in order to purchase the product, the buyer user generally needs to pay the seller user 1,000 Yuan. However, if the buyer user makes a commitment to the seller user with a consumption amount of no less than 3,000 Yuan (i.e., the predetermined amount) within 30 days (i.e., the predetermined period of time), indicating that the buyer user is willing to commit to a long-term consumption from the seller user, the buyer user will obtain a 20% discount (equivalent to the first ratio a=80%) within the 30 days. For example, the buyer user can purchase the above mentioned product H for 800 Yuan. On the one hand, the buyer user does not need to recharge the consumer card in advance at the seller user, avoiding the risk of buyer user's property loss due to bankruptcy or other reasons; and on the other hand, the seller user can lock in the consumption amount in advance based on the above commitment. As such, both the buyer and seller are mutual benefited.

In one embodiment, the predetermined period of time may be a fixed period defined by predetermined start and end times. For example, the start time may be Jun. 10, 2018, and the end time may be Jul. 9, 2018, then the predetermined period of time is from Jun. 10, 2018 to Jul. 9, 2018.

In another embodiment, the predetermined period of time, instead of having a fixed start or end time, may be a predetermined duration of time, for example, one month. For example, if the first user sends the information to the service platform on Jun. 10, 2018, then the predetermined period of time will last for one month from that date. As another example, if the first user sends the information to the service platform on Jul. 12, 2018, the predetermined period of time will last for one month from Jul. 12, 2018.

In yet another embodiment, types of the resources and service object may vary in different service scenarios. For example, in the network data sharing scenario, the resources may be network data owned by the first user, and the service object may be network data owned by the second user. The first user can obtain a preferential sharing scheme of the first ratio a based on the technical solution of this specification, so that the first user can allocate more network resources to obtain the second user's network data. When the first user fails to keep the commitment, the second user can obtain a network data compensation according to a second ratio b (for example, the second user may subsequently reduce the amount of network data shared with other users). As another example, in the transaction scenario, the resources may be funds, and the first user may be a buyer, the service object may be a product, and the second user may be a seller. The buyer, based on the technical solution of this specification, may obtain a discount of the first ratio a for the product, and the seller can receive a compensation of a second ratio b when the buyer fails to keep the commitment.

In still another embodiment, the service platform may allow the first and second users to interact with each other online. For example, on an interactive webpage provided by the service platform, the first user may browse introduction information of a service object, and submit an order for the service object. When the first user makes a corresponding commitment through the information and the credit value of the first user meets the requirements, the service platform may calculate an amount of resources to be sent by the first user, based on a standard amount of resources corresponding to the service object and the first ratio a, and then drive the processing of the order.

In some embodiments, the first and second users may interact with each other offline. For example, upon receiving the information from the first user, the service platform may provide the first user with a credential if the first user's credit value meets requirements, and the first user can obtain the preferential first ratio a from the second user by presenting the credential to the second user. As another example, instead of showing the credential to the second user, the first user can simply send to the second user, via the service platform, a corresponding amount of resources, then the service platform automatically configures the amount of resources need to be sent by the first user to be consistent with the first ratio a based on the information already sent by the first user.

In step 104, when the amount of resources actually sent by the first user to the second user within the predetermined period of time is less than the predetermined amount, a balance compensation process can be triggered, to cause the first user to send a balance resource to the second user by a deadline, wherein a ratio of an amount of the balance resource to the standard amount of resources is defined as a second ratio b, where $0<b\leq 1-a$.

In one embodiment, the first user may make a commitment via sending information to service platform, so that the first user does not need to pre-store the predetermined amount of resources at the second user in order to obtain the preferential first ratio a, avoiding the risk of the second user being unable to return the pre-stored resources due to any unexpected event. The second user can lock the first user's willingness to interact in advance to ensure that the predetermined amount of resources can be obtained. In the meanwhile, even if the first user fails to keep the commitment, the second user will still obtain a balance resource at the second ratio b from the service platform. In this way, the commitment made by the first user can be endorsed and supported by the service platform, which improves the credibility of the commitment.

In another embodiment, the deadline may be a period of time beginning after the end of the predetermined period of time, and the start time, end time, duration, etc. can be set by the service platform. For example, the end time of the predetermined period of time can be set as the start time of the predetermined deadline, and another predetermined time period can be set as the duration of the predetermined deadline. In another example, the end time of the predetermined period of time can be set as the start time of the predetermined deadline, and 24:00 pm on the last day of the current month can be set as the end time of the predetermined deadline. This specification is not limited to one or more embodiments described herein.

In yet another embodiment, the service platform may send a notification to the first user, notifying the first user to send the balance resource to the second user by the deadline. The service platform may send one or more such notifications, at times including, for example, immediately after the end of the predetermined period of time, at midpoint of the deadline, at a certain time before the end of the deadline, at a fixed time on each natural day during the deadline, etc. This specification is not limited to one or more embodiments described herein.

In still another embodiment, the service platform may automatically deduct and send the balance resource from a user resource pool corresponding to the first user to the second user. For example, in the network data sharing scenario, the user resource pool may be all network data held by the first user, and the sharing management platform may delete some of the network data according to the download order or to a default order, as a penalty to the first user. In the transaction scenario, the user resource pool may be an account of the first user. In case of the service platform being authorized to deduct from the account (the first user may authorize the service platform by the commitment made thereto; or even obtaining the deduction authority is a prerequisite for the service platform to recognize the commitment), the service platform can directly deduct an amount corresponding to the balance resource and transfer the deduction to the second user's account.

In some embodiments, at first, the service platform may send a notification to the first user, notifying the first user to send the balance resource to the second user by the deadline. Then, if the first user fails to do so, the service platform may automatically deduct and send the balance resource from a user resource pool corresponding to the first user to the second user.

In some other embodiments, if the first user fails to send the balance resource to the second user by the deadline, the service platform may trigger a credit default process, which, for example, may include lowering the first user's credit value. If the first user's credit value is maintained by the service platform, the service platform may lower the credit value automatically. Otherwise, if the credit value is managed by the credit management platform, the service platform may provide a feedback to the credit management platform, requesting the credit management platform to lower the credit value. As another example, the credit default process may include restricting the first user's participation in services so that the first user can no longer benefit from solutions described herein and will have to obtain any service object at the cost of paying a standard amount of resources. As still another example, the credit default process may include adding the first user to a credit blacklist and sharing this information with other platforms, causing future adverse consequences on the first user. Without limitation, the credit default process may also include other countermeasures or a combination of multiple countermeasures.

In still some other embodiments, when the first user has at least one associated user whose credit value reaches the predetermined value, if each of the first user and the associated user makes a commitment to sending to the second user no less than the predetermined amount of resources within the predetermined period of time, it is equivalent to the first user inviting the associated user to participate in the service with the second user, thus expanding the size of the service. In response, the service platform may decrease a value of the first ratio a so that each of the first and associated users can pay less amount of resources as an incentive to the first user. There may be one or more such associated users, and each of them should make a commitment to sending to the second user no less than the predetermined amount of resources within the predetermined period of time.

When each of the first and associated users has sent an actual amount of resources that is less than the predetermined amount within the predetermined period of time, the process in step 104 may be triggered to cause the first user to send a balance resource to the second user. In one embodiment, the "first user" and "associated user(s)" are role types. When users A and B participate in the service with the second user in association with each other, the user A may be interpreted as the "first user" and the user B as the "associated user" from the user A's perspective; and the user B may be interpreted as the "first user" and the user A as the "associated user" from the user B's perspective. Therefore, while it has been described in step 104 as sending a balance resource to the second user only by the first user, in practice, the associated user may also be required to send a balance resource to the second user in order to indemnify the second user from any loss. In another embodiment, the "first user" may first participate in the service with the second user and then invite the "associated user" to also participate therein. For example, the user A may first participate in the service with the second user and then invite the user B to also participate in the service. In this case, the user A will be always identified as the "first user", and the user B as the "associated user". Accordingly, the user A may be required to send a balance resource to the second user, while the user B may be configured to either send a balance resource to the second user, or not do so under some conditions (for example, if it is the first time for the user B to transact with the second user).

In some embodiments, within the predetermined period of time, the first user sends no less than the predetermined amount to the second user, but an actual amount of resources of the at least one associated user sent to the second user is less than the predetermined amount. In other words, while the first user has kept the commitment, the associated user does not. In this case, the service platform may trigger an adjusted compensation process so that the first user shall send an adjusted amount of resources to the second user by the predetermined deadline. The adjusted amount of resources in a third ratio c to the standard amount of resources, which is equal to the decrease of the first ratio a. For example, if a is equal to 80% by default and is decreased to a'=60% due to the co-participation of the first and associated users in the service, then c is equal to the decrease, i.e., c=a−a'=80%-60%=20%. In other words, although the first user cannot enjoy a discount of the decreased first ratio a' any longer, he/she can still benefit from the discount of the first ratio a, without having to refund all the balance resources to the second user.

In some other embodiments, when there is at least one user associated with the first user, whose credit value reaches the predetermined value, an initial amount of resources that both the first and associated users shall send to the second user may be in the first ratio a to the standard amount of resources associated with the second user's service object. That is, the first ratio a is not decreased at all. Subsequently, if each of the first and associated users send to the second user an actual amount of resources that is not less than the predetermined amount within the predetermined period of time, the service platform may trigger a refund process so that the second user shall refund to the first user an amount of resources in a fourth ratio d to the standard amount of resources, where 0<d<a. This is equivalent to a reduction in the amount of resources provided by the first and associated users for the service (i.e., the amount of resources actually sent is equal to the initially sent amount minus the refund from the second user), as an incentive to the first and associated users for keeping their commitments.

Figure 2:
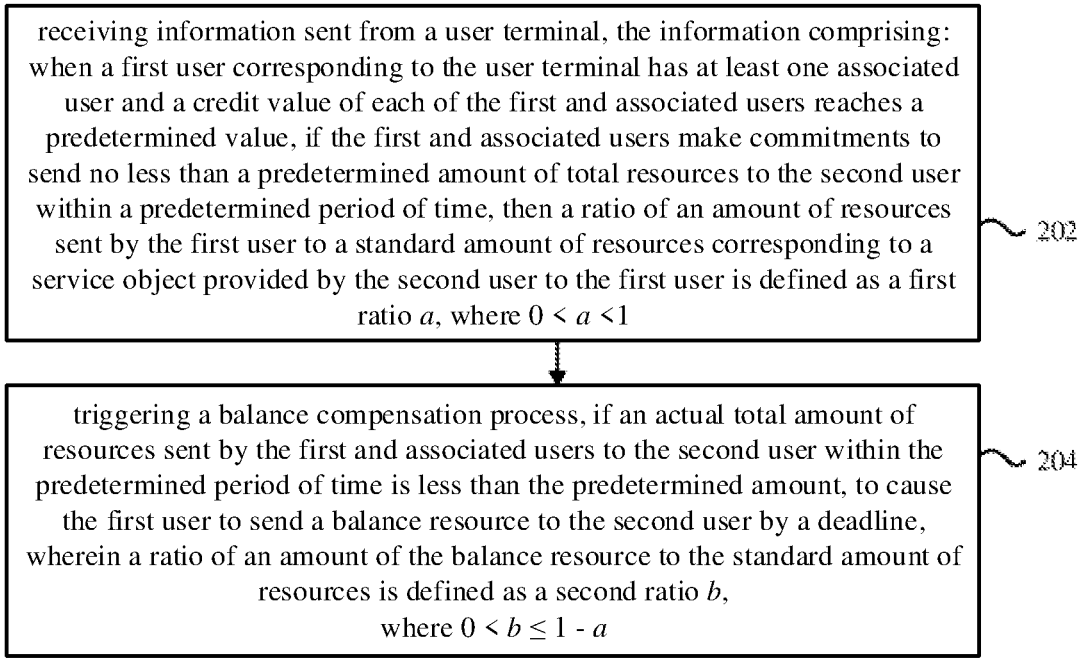
FIG. 2 is a flow diagram of another method for processing a service according to an exemplary embodiment.

FIG. 2 is a flow diagram of another method for processing a service according to an exemplary embodiment. As shown in FIG. 2, the method is used on a service platform and may include the steps as detailed below.

In step 202, receiving information sent from a user terminal. The information comprises: when a first user corresponding to the user terminal has at least one associated user and a credit value of each of the first and associated users reaches a predetermined value, if the first and associated users make a commitment to sending a total amount of resources not less than a predetermined amount of resources to the second user within a predetermined period of time, then a ratio of an amount of resources sent by the first user to a standard amount of resources corresponding to a service object provided by the second user to the first user is defined as a first ratio a, where 0<a<1.

In one embodiment, the service platform and the second user may negotiate with each other in advance and enter into an agreement on service rules such as start and end times of the predetermined period of time, a duration of the predetermined period of time, a value of the predetermined amount, a value of the first ratio a, a value of the second ratio b, etc. The first and associated users may review these service rules and, when agreeing upon these service rules, authorize the formation of the above information, and send the formation to the service platform, thereby making the following commitment. The commitment may include that within the predetermined period of time, the first and associated users will send no less than a predetermined amount of total resources to the second user, so that within the same period of time, the first and associated users can get the corresponding service object from the second user at the first ratio a instead of paying the standard amount of resources corresponding to the service object. The first and associated users may participate in the service with the second user at the same time, or the first user participates first and then invites the associated user. This specification is not limited to one or more embodiments described herein.

In another embodiment, in order to ensure that the above commitment is fulfilled or increase the probability of fulfillment, the service platform may verify the first and associated users' credit statuses. If the first and associated users' credit values both reach (e.g., being higher than or equal to) the predetermined value, it indicates that the first and associated users have good credits and their commitment will be accepted so that the first and associated users are entitled to obtaining the service object from the second user at the first ratio a within the predetermined period of time. If any of the first and associated users' credit values does not reach the predetermined value, it may indicate that they have poor credit and their commitment may be rejected so that they have to obtain the second user's service object with the standard amount of resources. The credit values may be, without limitation, in the form of scores, numbers, ratings or the like.

In one embodiment, the first and associated users' credit values may be retrieved from the service platform itself. That is, the service platform may have user credit assessment capabilities. Alternatively, the credit values may be retrieved from a credit management platform. That is, the service platform may retrieve the credit values of the first and associated users from the credit management platform.

According to one embodiment, in a network data sharing scenario, the service platform may be a sharing management platform, and the first and associated users may send the information to the sharing management platform to make a commitment to sharing with the second user network data (i.e., the resources to be sent by the first and associated users to the second user) no less than a predetermined amount within a predetermined period of time, so that when the first and associated user' credit statuses meet requirements, they can obtain the corresponding network data from the second user (i.e., network data provided by the second user for sharing) at the first ratio a. For example, in case of the second user having 1 GB of network data, and based on the principle of equivalent exchange, the corresponding standard amount of resources is set to 1 GB, in general cases, the first and associated users would have to share 1 GB of network data with the second user before they can get the second user's same amount of network data. However, if the first and associated users make a commitment to sharing 20 GB or more (i.e., the predetermined amount) of network data with the second user within 10 days (i.e., the predetermined period of time), indicating that the first user and the associated users are willing to maintain long-term data sharing with the second user, then the first and associated users will be privileged to get the second user's network data with a preferential sharing scheme: sharing 0.8 GB to obtain 1 GB (i.e., the first ratio a=80%) within that period of time. This preferential sharing scheme is advantageous in allowing the first and associated users to allocate more of their limited uplink and downlink bandwidths or other network resources to obtaining the second user's network data, thus encouraging the first and associated users' data sharing activities. Wide application of this commitment-based preferential sharing scheme enables effective sharing of network data in a network environment.

According to one embodiment, in a shopping scenario, the service platform may be a transaction platform, and the buyer user and associated buyer user can send the information to the transaction platform to make a commitment to a consumption at the seller user of no less than a predetermined amount (i.e., the resources to be sent by the buyer user and the associated buyer user to the seller user) within a predetermined period of time, so that when the buyer user and associated buyer user's credit statuses both meet requirements, they can obtain products from the seller user (i.e., the service object provided by the seller user) at the first ratio a. For example, for the seller user's product H having a marked price of 1,000 Yuan, that is, in order to get the product, the buyer user and associated buyer user need to pay the seller user 1,000 Yuan. However, if the buyer user and associated buyer user make a commitment to the seller user with a consumption amount of no less than 3,000 Yuan (i.e., the predetermined amount) within 30 days (i.e., the predetermined period of time), indicating that the they are willing to commit to a long-term consumption from the seller user, they will obtain a 20% discount (i.e., the first ratio a=80%) within the 30 days. For example, they can purchase the above mentioned product H for 800 Yuan. On the one hand, the buyer user and associated buyer user do not need to recharge the consumer card in advance at the seller user, avoiding the risk of buyer user and associated buyer user's property loss due to bankruptcy or other reasons; and on the other hand, the seller user can lock in the consumption amount in advance based on the above commitment. As such, both the buyer and seller are mutual benefited.

In one embodiment, the predetermined period of time may be a fixed period defined by predetermined start and end times. For example, the start time may be Jun. 10, 2018, and the end time may be Jul. 9, 2018, then the predetermined period of time is from Jun. 10, 2018 to Jul. 9, 2018.

In another embodiment, the predetermined period of time, instead of having a fixed start or end time, may be a predetermined duration of time, for example, one month. For example, if the first user sends the information to the service platform on Jun. 10, 2018, then the predetermined period of time will last for one month from that date. As another example, if the first user sends the information to the service platform on Jul. 12, 2018, the predetermined period of time will last for one month from Jul. 12, 2018.

In yet another embodiment, types of the resources and service object may vary in different service scenarios. For example, in the network data sharing scenario, the resources may be network data owned by the first user and the associated user, and the service object may be network data owned by the second user. The first user and the associated user may obtain a preferential sharing scheme of the first ratio a based on the technical solution of this specification, so that they can allocate more network resources to obtain the second user's network data. When the first user and the associated user fail to keep the commitment, the second user can obtain a network data compensation according to a second ratio b (for example, the second user may subsequently reduce the amount of network data shared with other users). As another example, in the transaction scenario, the resources may be funds, and the first user and the associated user may be buyers, the service object may be a product, and the second user may be a seller. The buyers may, based on the technical solution of this specification, may obtain a discount of the first ratio a for the product, and the seller can receive a compensation of a second ratio b when the buyer fails to keep the commitment.

In still another embodiment, the service platform may allow the first user and the associated user to interact with the second user online. For example, on an interactive webpage provided by the service platform, the first user and the associated user may browse introduction information of a service object, and submit an order for the service object (the first user may submit the order, followed by the associated user's confirmation of the submission; alternatively, the first user and the associated user may submit separate orders, and the service platform then combine them into a single order based on the association between the two users). When the first user and the associated user make a corresponding commitment through the information and the credit value of the first user and the associated user meet the requirements, the service platform may calculate an amount of resources to be sent by the first user or the associated user, based on a standard amount of resources corresponding to the service object and the first ratio a, and then drive processing of the order.

In some embodiments, the first user and the associated user may interact with the second user offline. For example, upon receiving the information, the service platform may provide the first user and the associated user with separate credentials if their credit values meet requirements, and the first user and the associated user can obtain the preferential first ratio a from the second user by presenting their credentials to the second user. As another example, instead of presenting the credentials, the first user and the associated user can simply send to the second user, via the service platform, a corresponding amount of resources, then the service platform automatically configures the amount of resources need to be sent by the first user and the associated user to be consistent with the first ratio a based on information already sent by the first user and the associated user.

In step 204, when the amount of resources actually sent by the first user and the associated user to the second user within the predetermined period of time is less than the predetermined amount, a balance compensation process can be triggered, to cause the first user to send a balance resource to the standard amount of resources is defined as a second ratio b, where $0<b\leq1-a$.

In one embodiment, the first user and the associated user may make a commitment via sending information to service platform, so that the first user and the associated user do not need to pre-store the predetermined amount of resources at the second user in order to obtain the preferential first ratio a, avoiding the risk of the second user being unable to return the pre-stored resources due to any unexpected event. The second user can lock the first user and the associated user's willingness to interact in advance to ensure that the predetermined amount of resources can be obtained. In the meanwhile, even if the first user and/or the associated user fail to keep the commitment, the second user will still obtain a balance resource at the second ratio b from the service platform. In this way, the commitment made by the first user and the associated user can be endorsed and supported by the service platform, which improves the credibility of the commitment.

In another embodiment, the predetermined deadline may be a period of time beginning after the end of the predetermined period of time, and the start time, end time, duration, etc. can be set by the service platform. For example, the end time of the predetermined period of time can be set as the start time of the predetermined deadline, and another predetermined time period can be set as the duration of the predetermined deadline. In another example, the end time of the predetermined period of time can be set as the start time of the predetermined deadline, and 24:00 pm on the last day of the current month can be set as the end time of the predetermined deadline. This specification is not limited to one or more embodiments described herein.

In yet another embodiment, the service platform may send a notification to the first user (or the first user and the associated user), notifying the first user and the associated user to send the balance resource to the second user by the deadline. The service platform may send one or more such notifications, at times including, for example, immediately after the end of the predetermined period of time, at midpoint of the predetermined deadline, at a certain time before the end of the predetermined deadline, at a fixed time on each natural day during the predetermined deadline, etc. This specification is not limited to one or more embodiments described herein.

In still another embodiment, the service platform may actively deduct and send the balance resource from a user resource pool corresponding to the first user to the second user. For example, in the network data sharing scenario, the user resource pool may be all network data held by the first user, and the sharing management platform may delete some of the network data according to the download order or to a default order, as a penalty to the first user. In the transaction scenario, the user resource pool may be an account of the first user. In case of the service platform being authorized to deduct from the account (the first user may authorize the service platform by the commitment made thereto; or even obtaining the deduction authority is a prerequisite for the service platform to recognize the commitment), the service platform can directly deduct an amount corresponding to the balance resource and transfer the deduction to the second user's account.

In some embodiments, at first, the service platform may send a notification to the first user (or both the first user and the associated user), notifying the first user (or the first user and the associated user) to send the balance resource to the second user by the specified deadline. Then, if the first user fails to do so, the service platform may automatically deduct and send the balance resource from a user resource pool corresponding to the first user to the second user.

In some other embodiments, if the first user fails to send the balance resource to the second user by the predetermined deadline, the service platform may trigger a credit default process, which, for example, may include lowering the first user's credit value. If the first user's credit value is maintained by the service platform, the service platform may lower the credit value automatically. Otherwise, if the credit value is managed by the credit management platform, the service platform may provide a feedback to the credit management platform, requesting the credit management platform to lower the credit value. As another example, the credit default process may include restricting the first user's participation in services so that the first user can no longer benefit from solutions described herein and will have to obtain any service object at the cost of paying a standard amount of resources. As still another example, the credit default process may include adding the first user to a credit blacklist and sharing this information with other platforms, causing future adverse consequences on the first user. Without limitation, the credit default process may also include other countermeasures or a combination of multiple countermeasures.

In still some other embodiments, if the first user fails to send the balance resource to the second user by the deadline, the service platform may trigger a credit default process against the first user. In other words, the "first user" and the "associated user" are only liable to his/her own credit status but not the other's.

In yet some other embodiments, if the first user fails to send the balance resource to the second user by the deadline, the service platform may trigger a credit default process against both the first and associated users. In this case, the "first user" and the "associated user" are liable to the other's credit status. This helps the first user and the associated user to supervise each other, increasing the probability of timely delivery of the balance resource.

Figure 3:
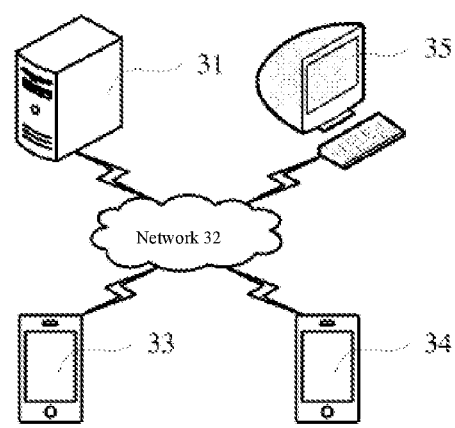
FIG. 3 is a schematic diagram illustrating the structure of a system for processing a service according to an exemplary embodiment.

FIG. 3 is a schematic illustrating the architecture of a system for processing a service provided in an exemplary embodiment. As shown in FIG. 3, the system may include a server 31, a network 32, mobile phones 33, 34, a PC 35 and the like. The server 31 may be either a physical server incorporating a standalone host machine or a virtual server provided by a collection of host machines. The server 31 may provide the service platform described herein, which is, for example, a payment platform. Each of the mobile phones 33, 34 may be an electronic device used by the first user or associated user and may run a client application 1 with the capabilities of performing the service functions described herein in relation to the first user or associated user. Each of the first user and associated user may be an individual, an enterprise or the like. Without limitation, in addition to the mobile phones 33, 34, the first user or associated user may also use another type of electronic device such as a PC, a tablet, a notebook, a personal digital assistant (PDA) or a wearable device (e.g., smart glasses, smart watches, etc.) The PC 35 may be an electronic device used by the second user, and the PC 35 may run a client application 2 capable of performing the service functions described herein in relation to the second user. The second user may be a merchant or the like. Without limitation, in addition to the PC 35, the second user may also use another type of electronic device such as a mobile phone, a tablet, a notebook, a personal digital assistant (PDA) or a wearable device (e.g., smart glasses, smart watch, etc.) The mobile phones 33, 34 and PC 35 may interact with the server 31 via the network 32, which may be one of various wired or wireless networks. Examples of the network 32 may include public switched telephone networks (PSTNs) and the Internet.

Figure 4:
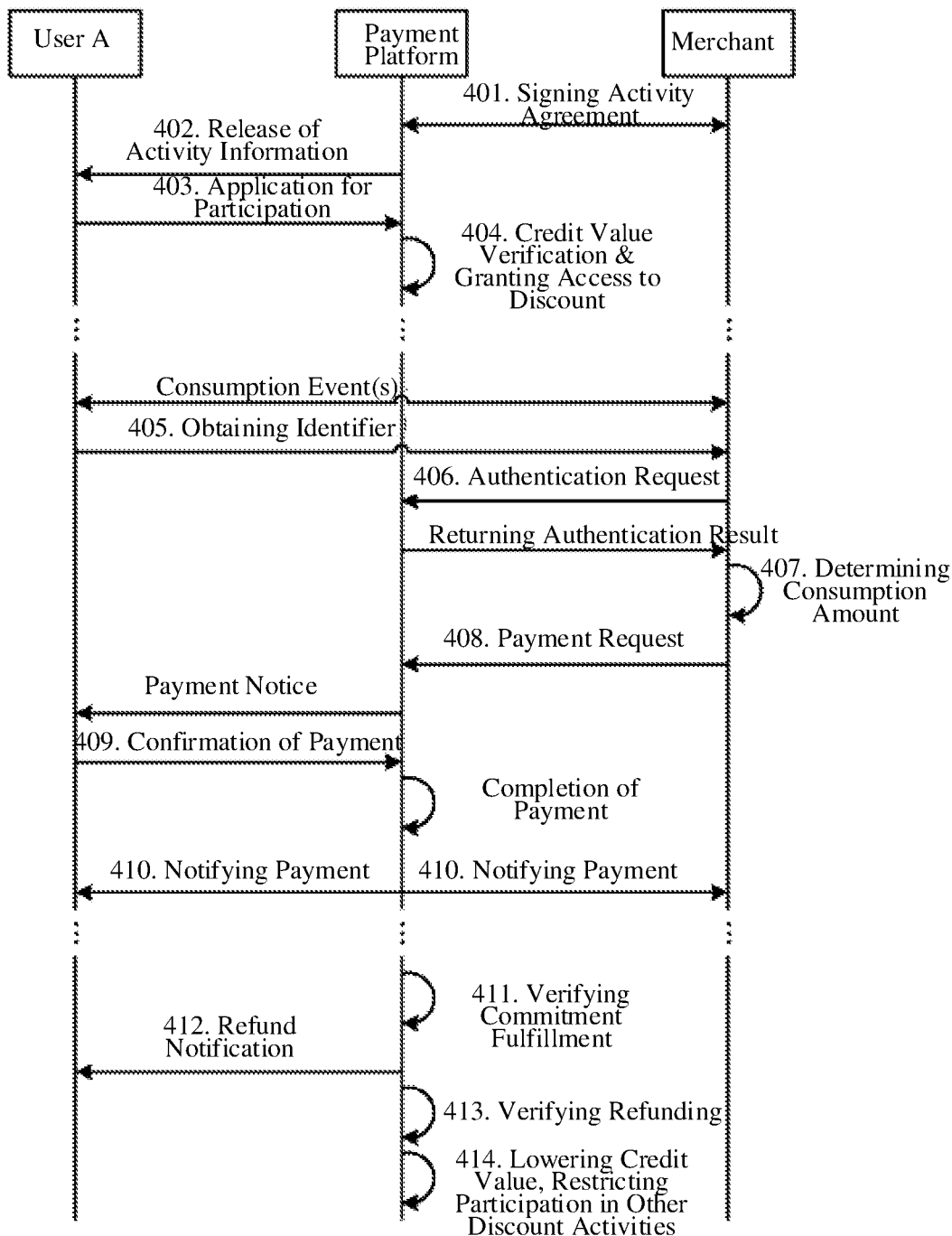
FIG. 4 is a schematic diagram illustrating service interactions in a transaction scenario according to an exemplary embodiment.

The following description will be given in the exemplary context where the system of FIG. 3 processes a service. Assuming user A uses the mobile phone 33, user B uses the mobile phone 34, the merchant use the PC 35, and the server 31 provides the payment platform, then user A, user B, the merchant and the payment platform can perform data interaction to implement the service processing solutions in this specification. FIG. 4 is a schematic diagram of service interactions in a transaction scenario according to an exemplary embodiment. As shown in FIG. 4, the process of service interactions may include the following steps.

In step 401, an activity agreement is signed between the payment platform and the merchant.

According to an embodiment in the specification, in a transaction scenario, users can make consumption commitments based on their own credit, and can enjoy corresponding consumption discounts without pre-paying the merchant. As such, the payment platform may negotiate with the merchant in advance to achieve an agreement on a minimum credit value that allows a user to participate in the activity, a predetermined transaction amount, a discount period, a transaction discount for the user, a refund scheme for the discounted amount in case of default, etc.

In one embodiment, based on the negotiation between the payment platform and the merchant, the payment platform may receive discount terms and conditions that have been confirmed and signed by the merchant. The discount clause covers the negotiation content described above and other negotiation content, so that the payment platform and the merchant can reach an informed negotiation result.

In step 402, the payment platform releases activity information about to user A.

In one embodiment, as the user A is viewing information about the merchant such as a webpage, the payment platform may provide the activity information about the activity agreement to user A so that the user A can view and take an action on it.

In another embodiment, even when the user A has not actively viewed the information about the merchant such as the webpage, the payment platform may still make the activity information available to user A so that user A can view and take an action on it.

In step 403, user A submits an application for participating in the activity to the payment platform.

In one embodiment, when user A is interested in the activity, he/she may create an authorization request based on the activity information, showing user A is willing to abide by the rules contained in the activity information in order to obtain the corresponding benefits. User A may then send the authorization request to the payment platform, which is equivalent to the information sent by the first user to the service platform as described in the foregoing embodiments. The authorization request may be regarded as one implementation of the information for showing user A's willingness to make the commitment.

In step 404, the payment platform verifies user A's credit value to determine whether to grant user A an access to the discount.

In one embodiment, since it involves user A making a consumption commitment to the merchant, the merchant needs to make sure that the user A can actually keep the commitment and can withdraw the relevant preferential capital if the commitment is not complied with. This can be achieved with user A's credit value: if the credit value reaches a predetermined value, it is determined that user A has good credit and is allowed to participate in the activity; otherwise, if user A's credit value does not reach the predetermined value, it is determined that the user A has poor credit and is not allowed to participate in the activity.

In another embodiment, an activity agreement may include, if a user makes a commitment to transaction with the merchant of an accumulated amount not less than 1,000 Yuan within one month after the participation, the user will obtain a discount of 20% within the same period so that the user can only pay 80% of marked price; and if the user fails to keep the commitment, the user shall make up any discounted amount that he/she has obtained so as to cancel the 20% discount.

For example, assuming user A wants to buy an item with a marked price of 300 Yuan from the merchant, when user A is within the discount period specified in the activity agreement (e.g., one-month period), the user A can enjoy a 20% discount and only needs to pay 300×80%=240 Yuan. When user A does not participate the activity, or is not within the discount period, user A needs to pay the full price, i.e., 300 Yuan.

In step 405, when user A has a consumption from the merchant, the merchant may obtain an identifier of the user A.

In one embodiment, user A may open a payment interface at the mobile phone 33, which may include an QR code associated with the user A's identity. The merchant may scan the QR code through a scanning device associated with PC 35 to obtain user A's identifier (plain text or cipher text).

In step 406, the merchant may send to the payment platform an authentication request containing user A's identifier.

In one embodiment, the payment platform may, based on the identifier included in the authorization request, query whether the identifier is qualified for the discount provided by the merchant, and return an authentication result to the merchant.

In step 407, the merchant receives the authorization result return by the payment platform and determines a consumption amount.

In one embodiment, if the authentication result shows that user A is qualified for the discount, the PC 35 may perform a discount calculation on the consumption amount based on the discount authentication, and take the calculated amount as an actual consumption amount. If the authentication result shows that user A is not qualified for the discount, the PC 35 will not perform the discount calculation and directly take a non-discounted standard amount for the consumption as the actual consumption amount that the user A shall pay.

In step 408, based on the determined consumption amount, the merchant sends a payment request to the payment platform.

Instead of performing steps 406-407 to determine the actual consumption amount that the user A shall pay, the merchant may alternatively simply, without calculating the actual transaction amount, provide user A's identifier and the standard amount for the consumption to the payment platform in step 408. The payment platform then determines the actual consumption amount based on whether user A's identifier is qualified for the transaction discount.

In step 409, in response to the payment request, the payment platform sends a payment notice to user A and complete the payment when receiving a confirmation of payment from user A.

In one embodiment, the mobile phone 33 may present a payment interface to user A for review, which may include information about the product, the merchant, the marked price, the discounted price and so on. After user A confirms the information is correct, user A may trigger the "confirm payment" in the payment interface or use other method to make the mobile phone 33 to return a payment confirmation to the payment platform. The payment platform may deduct a corresponding amount from an account associated with the user A, and transfer the deducted amount to the merchant's account when the merchant has a merchant account opened at the payment platform or other financial institution, thus completing the payment.

In step 410, the payment platform notifies both user A and the merchant of the payment result.

In step 411, the payment platform verifies whether the commitment is fulfilled.

In one embodiment, the payment platform can summarize the consumption of user A after the time period specified in the activity agreement, so as to determine whether user A has reached the consumption commitment specified in the activity agreement.

For example, if marked prices of products purchased by user A from the merchant during the discount period sum to 3,000 Yuan, then because of the 20% discount, the total amount actually paid by the user A is 3,000×80%=2,400 Yuan, greater than 1,000 Yuan (predetermined amount). Therefore, user A has fulfilled the transaction commitment and does not need to refund the discounted amount.

As another example, if marked prices of product purchased by user A from the merchant during the discount period sum to 1,200 Yuan, because of the 20% discount, the total amount actually paid by the user A is 1200×80%=960 Yuan, less than 1,000 Yuan (predetermined amount). Therefore, user A fails to fulfill the transaction commitment and needs to refund the discounted amount.

In step 412, in the situation that the user A fails to fulfill the transaction commitment, the payment platform sends to a discount refund notification to refund the discounted amount to the merchant.

In one embodiment, the mobile phone 33 may display the discount refund notification sent by the payment platform to the user A, which may include reasons for the refund (user A is unable to fulfill the transaction commitment), the discounted amount that shall be refunded, a deadline in which the refund shall be paid, etc so as to notify the user A to refund the discounted amount to the merchant by a refund deadline.

In another embodiment, the notification may take any form such as, an in-application message from the client application provided by the payment platform, a short message service (SMS), an instant message, an email, a voice message played once a call is answered, etc. This specification is not limited to one or more embodiments described herein.

In step 413, the payment platform verifies whether the refund has been paid.

In one embodiment, by the refund deadline, the payment platform may send multiple notifications to the user A before he/she refunds the discounted amount.

In another embodiment, if the user A has enabled an automatic refund function in advance, the payment platform may deduct automatically the discounted amount from user A's account and transfer the deduction to the merchant's account before the refund deadline expires, thus avoiding user A from failing to refund the discounted amount before the expiration due to negligence or some other reason.

In step 414, if the user A fails to refund the discounted amount, the payment platform lowers the his/her credit value and/or restricts his/her participations in other discount activities.

In one embodiment, if the user A fails to refund the discounted amount by the refund deadline, the payment platform may trigger a credit default process including, for example, lowering the user A's credit value, restricting his/her participations in other discount activities and/or the like, as a penalty. The credit default process may also include other penalty measures, and this specification is not limited to one or more embodiments described herein.

In addition to participating in the merchant's discount activity alone, user A may participate together with other associated users, such as user B. An embodiment in which users A and B that are associated with each other together participate in the discount activity will be described below. Besides the following embodiment, it is also possible for three or more associated users to together participate in the discount activity.

Figure 5:
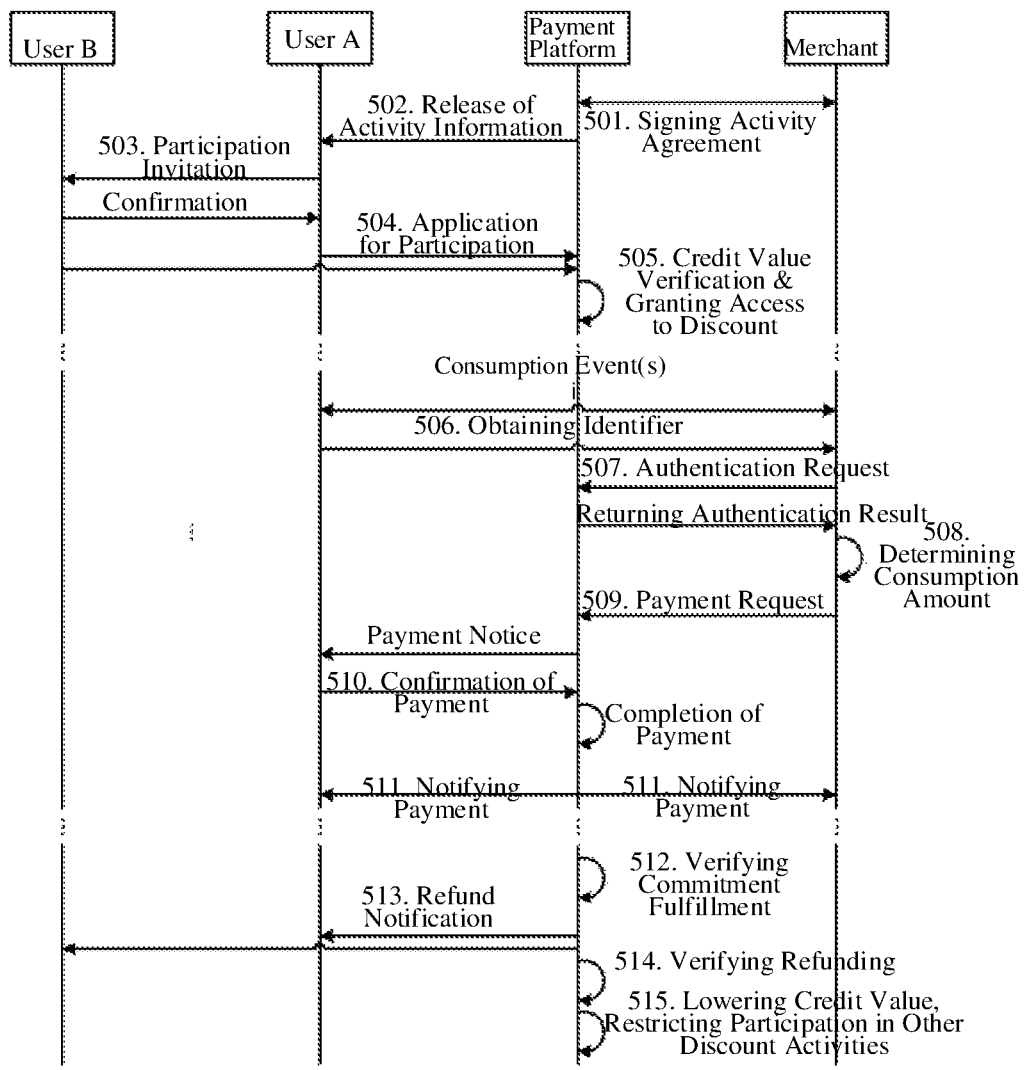
FIG. 5 is a schematic diagram illustrating service interactions in another transaction scenario according to an exemplary embodiment.

FIG. 5 is a schematic diagram illustrating service interactions in another transaction scenario according to an exemplary embodiment. As shown in FIG. 5, the process of service interactions may include the steps as detailed below.

In step 501, an activity agreement is signed between the payment platform and the merchant.

In step 502, the payment platform releases activity information about to user A.

In one embodiment, reference can be made to the above description given in connection with steps 401-402 shown in FIG. 4 for details in steps 501-502, and a repeated detailed description thereof is omitted here.

In step 503, the user A invites the user B to participate in the activity and receives a confirmation of the invitation from the user B.

In one embodiment, the user A may invite the user B to together participate in the merchant's discount activity. The user B may choose to accept or decline the invitation on his/her own discretion.

In step 504, the user A submits an application for participating in the activity to the payment platform.

In one embodiment, since the user B is an invited participant in the discount activity, only the user A needs to submit an application for participating in the activity to the payment platform. In other words, the user A may represent both of user A and user B. In another embodiment, the users A and B may submit separate applications to the payment platform. Based on the invitation operation between user A and user B in step 503, the payment platform may have known the association between user A to user B, and thus identify user A and user B as associated participants in the discount activity.

In step 505, the payment platform verifies credit values of the users A and B to determine whether to grant them an access to the discount.

In one embodiment, when the user A's credit value reaches a predetermined value but the user B's credit value does not, the payment platform may reject the B's participation and authorize only user A's participation in the discount activity, as shown in FIG. 4. Similarly, when the user B's credit value reaches the predetermined value but the user A's credit value does not, the payment platform may reject user A's participation and allows only user B's participation in the discount activity.

In another embodiment, when the credit value of each of the users A and B reaches the predetermined value, the payment platform may allow each of the users A and B to participate in the discount activity as associated participants and grant each of them an access to the discount. There may be multiple embodiments of users A and B's participation:

In one embodiment: the users A and B share the same commitment. For example, in FIG. 4, when user A alone makes a commitment, the commitment is that if user A has a consumption amount at the merchant not less than 1,000 Yuan within one month, user A can obtain a discount of 20%. When user A and user B share the same commitment, the commitment is that if the user A and user B has a total consumption amount at the merchant not less than 1,000 Yuan within one month, both user A and user B can obtain the 20% discount. By making a shared commitment, each user can reduce the consumption amount that each user needs to be committed to, reducing the difficulty of fulfilling the commitment. In addition, this is helpful in spreading and promoting the discount activity among multiple users.

In another embodiment: the users A and B make separate but associated commitments. For example, the commitment may include: if user A has a consumption amount of more than 1,000 Yuan at the merchant within a month, user A can get at least a 20% discount; if user B has a consumption amount of more than 1,000 Yuan at the merchant within a month, user B can get at least 20% discount; if each of user A and user B has a consumption amount of more than 1,000 Yuan at the merchant within a month, both user A and user B can get a 40% discount. Then, although each of the users separately makes the same commitment as that shown in FIG. 4, if multiple users can keep their commitments, they can obtain an even larger discount, encouraging the users to supervise and discipline each other.

In step 506, upon any consumption of the user A (or B) from the merchant, the merchant may obtain an identifier of the user A (or B).

In step 507, the merchant may send to the payment platform an authentication request containing the user A (or B)'s identifier.

In step 508, the merchant determines a consumption amount from an authentication result from the payment platform.

In step 509, based on the determined consumption amount, the merchant sends a payment request to the payment platform.

In step 510, in response to the payment request, the payment platform sends a payment notice to the user A (or B) and completes the payment when receiving a confirmation of payment from the user A (or B).

In step 511, the payment platform informs each of the user A (or B) and the merchant of the payment result.

In one embodiment, reference can be made to the above description given in connection with steps 405-410 shown in FIG. 4 for details in steps 506-511, and a repeated detailed description thereof is omitted here.

In step 512, the payment platform verifies fulfillment of the commitment.

In step 513, if any commitment is not fulfilled, the payment platform sends to each breaching user a discount refund notification to refund the discounted amount to the merchant.

In one embodiment, in the situation of the users A and B having together made a shared commitment, and there can be multiple situations:

In one embodiment: a total consumption amount of the users A and B from the merchant within the one-month period reaches 1,000 Yuan. In this case, it is determined that the users A and B have fulfilled the commitment and need not to refund the discounted amount.

In another embodiment: the total transaction amount of the users A and B from the merchant within the one-month period does not reaches 1,000 Yuan. In this case, it is determined that the users A and B fail to fulfill the commitment and need to refund the discounted amounts based on the products purchased by user A and user B respectively. Assuming the user A has purchased a product with a marked price of 200 Yuan at a discount of 20%, that is, user A actually only paid 200×80%=160 Yuan, then the user A shall refund the discounted amount, i.e., 200×(1−80%)=40 Yuan. Assuming user B has purchased a product with a marked price of 600 Yuan at the 20% discount, that is, user B actually only paid 600×80%=480 Yuan, then user B shall refund the discounted amount, 600×(1−80%)=120 Yuan.

In some embodiments, users A and B have separate but associated commitment, and there can be multiple situations:

In one embodiment: when user A's total consumption amount reaches 1,000 Yuan within the one-month period, and user B's total consumption amount also reaches 1,000 Yuan within the one-month period, it is determined that each of the users A and B has fulfilled their commitments and is thus qualified for the discount of 40%, without refunding any discounted amount.

In another embodiment: when the total consumption amount of the user A from the merchant within the one-month period reaches 1,000 Yuan, while the total consumption amount of user B does not, it is determined that user A and user B fail to fulfill their commitments and should refund the discounted amounts. As user A has fulfilled his/her individual commitment, he/she is qualified for the associated discount of 20%, but not the 40% discount which is qualified only if both of the users A and B fulfills his/her individual commitment. For example, if user A has purchased a product with a marked price of 200 Yuan at the 40% discount, i.e., actually only paying 200×60%=120 Yuan, then user A shall refund the additionally discounted amount, i.e., 200×(80%−60%)=40 Yuan. If user B has purchased product with a marked price of 600 Yuan at the 40% discount, i.e., actually paying only 600×60%=360 Yuan, then user B should refund the entire discounted amount, i.e., 600×(1−60%)=240 Yuan.

Similarly, when the total consumption amount of the user A from the merchant within the one-month period does not reach 1,000 Yuan, while the total consumption amount of user B does, then user A should refund the entire discounted amount due to the unfulfillment of the individual commitment. For example, if user A has purchased a product with a marked price of 200 Yuan at the 40% discount, i.e., actually only paying 200×60%=120 Yuan, then user A shall refund the discounted amount, i.e., 200×(1−60%)=80 Yuan. User B has fulfilled his/her individual commitment, thus user B is qualified for the associated discount of 20%, but not the 40% discount which is qualified only if both of the users A and B fulfills his/her individual commitment. If user B has purchased product with a marked price of 600 Yuan at the 40% discount, i.e., actually paying only 600×60%=360 Yuan, then user B should refund the discounted amount, i.e., 600×(80%−60%)=120 Yuan.

In yet another embodiment: when the total consumption amount of the user A from the merchant within the one-month period does not reach 1,000 Yuan, and the total consumption amount of user B from the merchant within the one-month period also does not reach 1,000 Yuan, it is determined that user A and user B fail to fulfill their commitments and should refund the discounted amounts. For example, if user A has purchased a product with a marked price of 200 Yuan at the 40% discount, i.e., actually only paying 200×60%=120 Yuan, then user A shall refund the discounted amount, i.e., 200×(1−60%)=80 Yuan. If user B has purchased product with a marked price of 600 Yuan at the 40% discount, i.e., actually paying only 600×60%=360 Yuan, then user B should refund the entire discounted amount, i.e., 600×(1−60%)=240 Yuan.

In still another embodiment, when user A should refund discounted amount, the payment platform may send to him/her a refund discount notification. Likewise, if the user B should refund discounted amount, the payment platform may send to him/her a refund discount notification. Since the users A and B are associated participants, even when, for example, only user A should refund a discounted amount while user B need not, it is also possible to send a refund discount notification to user B so that user B can notify user A to pay the refund, or even refund at least part of the amount on behalf of user A to alleviate his/her financial stress.

In step 514, the payment platform verifies whether the refunds have been paid.

In step 515, if the user A or B fails to refund the discounted amount in time, the payment platform lowers the user A or B's credit value and/or restricts the user A or B' participation in other discount activities.

In one embodiment, users A and B's credit statuses may be independent of each other. In this case, for example, if user A fails to refund the discounted amount in a timely way while user B does not need to refund any discounted amount, or has refunded the discounted amount, only user A may receive a penalty and user B may not.

In another embodiment, users A and B's credit statuses may be associated with each other. In this case, for example, even when user B does not need to refund any discounted amount, or has refunded the discounted amount, as along as the user A fails to refund the discounted amount in a timely way, both of them will receive penalties. In some embodiments, the penalty for user B may be smaller.

Figures 6, 7:
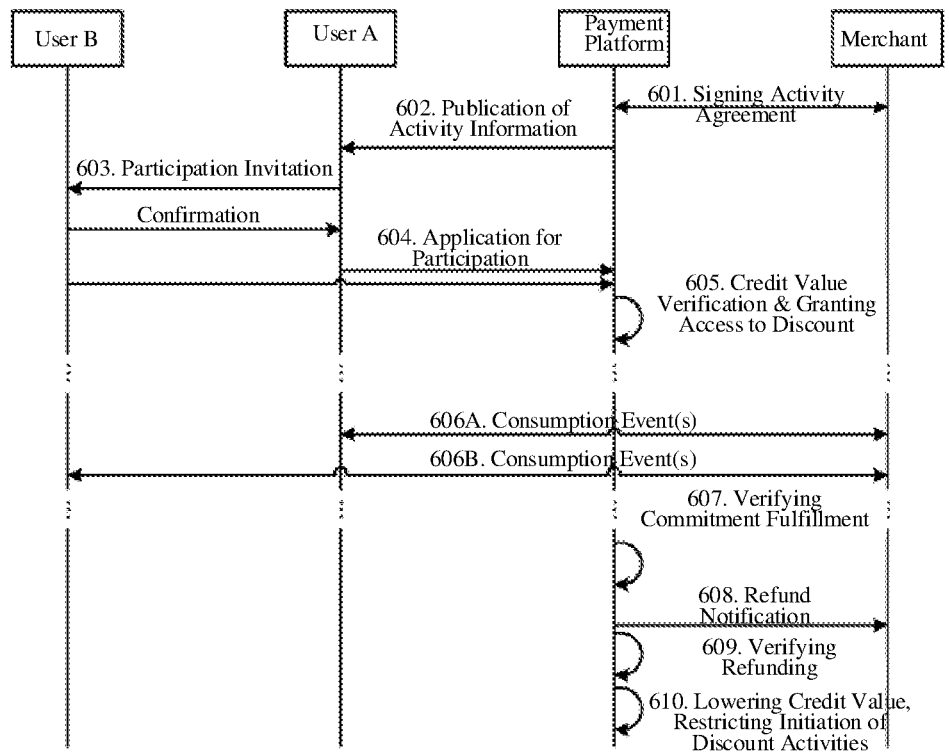
FIG. 6 is a schematic diagram illustrating service interactions in a further transaction scenario according to an exemplary embodiment.
FIG. 7 is a schematic diagram of creating a discount activity in accordance with an exemplary embodiment.

FIG. 6 is a schematic diagram illustrating service interactions in still another transaction scenario according to an exemplary embodiment. As shown in FIG. 6, the process of service interactions may include the steps as detailed below.

In step 601, an activity agreement is signed between the payment platform and the merchant.

In step 602, the payment platform releases information about the activity to user A.

In step 603, user A invites user B to participate in the activity and receives a confirmation of the invitation from user B.

In step 604, user A submits an application for participating in the activity to the payment platform.

In one embodiment, reference can be made to the above description given in connection with steps 501-504 shown in FIG. 5 for details in steps 601-604, and a repeated detailed description thereof is omitted here.

In step 605, the payment platform verifies credit values of the users A and B to determine whether to grant them an access to the discount.

In one embodiment, when the user A's credit value reaches a predetermined value but the user B's credit value does not, the payment platform may reject user B's participation and authorize only user A's participation, as shown in FIG. 4. Similarly, when user B's credit value reaches the predetermined value but user A's credit value does not, the payment platform may reject user A's participation and authorize only user B's participation.

In another embodiment, the users A and B make separate but associated commitments. For example, the commitment may include: if user A has a consumption amount of more than 1,000 Yuan at the merchant within a month, user A can get at least a 20% discount; if user B has a consumption amount of more than 1,000 Yuan at the merchant within a month, user B can get at least 20% discount; if each of user A and user B has a consumption amount of more than 1,000 Yuan at the merchant within a month, both user A and user B can get a 40% discount. Then, although each of the users separately makes the same commitment as that shown in FIG. 4, if multiple users can keep their commitments, they can obtain an even larger discount, encouraging the users to supervise and discipline each other.

In step 606A, user A has a consumption at the merchant at the discount of 20%.

In step 606B, user B has a consumption at the merchant at the discount of 20%.

In one embodiment, reference can be made to the above description given in connection with steps 405-410 shown in FIG. 4 for details in authentication and payment processes performed in steps 601-604, and a repeated detailed description thereof is omitted here.

In step 607, the payment platform verifies fulfillment of the commitments.

In step 608, if each of users A and B has fulfilled his/her individual commitment, the payment platform sends a refund notification to the merchant.

In one embodiment, when user A's total consumption amount reaches 1,000 Yuan within the one-month period, and user B's total consumption amount also reaches 1,000 Yuan within the one-month period, it is determined that each of the users A and B has fulfilled their commitments and is thus qualified for the discount of 40%. However, since user A and user B actually consume at a discount of 20%, the merchant shall refund to each of the users A and B an amount equivalent to an additional discount of 20%, i.e., the total discount is 40%.

In another embodiment, if the total transaction amount of user A from the merchant within the one-month period reaches 1,000 Yuan, while the total transaction amount of user B does not, then user A is only qualified for the initial 20% discount but not to the additional 20% discount in the form of a refund from the merchant. On the other hand, user B should refund the 20% discounted amount to the merchant, and reference can be made to the above description of the embodiment FIG. 5 for more details. Similarly, if the total transaction amount of user B from the merchant within the one-month period reaches 1,000 Yuan, and the total transaction amount of user A does not, then user B is only qualified for the initial 20% discount but not to the additional discount in the form of a refund from the merchant, and the user A shall refund the 20% discounted amount to the merchant.

In one embodiment, if neither of the total purchase amounts of user A nor user B from the merchant within the one-month period reaches 1,000 Yuan, then each of them shall refund the 20% discounted amount to the merchant in the same way as described above in conjunction with the embodiment of FIG. 5.

In step 609, the payment platform verifies whether the refunds have been paid by the merchant.

In step 610, if the merchant fails to pay the refunds in a timely way, the payment platform may lower its credit value or restrict its initiation of other such discount activities.

In one embodiment, the payment platform may notify the merchant to pay the refunds to the users A and B by a deadline. For example, if the merchant fails to do so, the payment platform may automatically deduct the corresponding amounts from the merchant's account and transfer the deductions to the users A and B's respective accounts. This entails an automatic refunding approach. In another case, if the merchant has not authorized the payment platform to automatically deduct any amount from its account, or if the merchant has given such authorization but the balance in the account is not enough, making the merchant unable to pay the refunds to the users A and B by the deadline, the payment platform may penalize the merchant.

A discount activity in a transaction scenario will be described below by way of example with reference to interfaces shown in FIGS. 7-11.

FIG. 7 is a schematic diagram of creating a discount activity in accordance with an exemplary embodiment. As shown in FIG. 7, a merchant may create a discount activity for a brand "X" through a activity creation interface 700. Via the activity creation interface 700, a activity period, a committed consumption amount, a basic discount, a preferential discount and the like can be configured. As such, throughout the activity period, a participant of the discount activity is allowed to buy products of the brand "X" at the "preferential discount." However, if an accumulated consumption amount of the participant within the activity period does not reach the "committed consumption amount", he/she is only qualified for the "basic discount" and shall refund a difference generated between the "preferential and basic discount". After completing the configuration, the merchant may confirm the creation of the discount activity by activating a "Confirm to Create" option and release it through a transaction platform so that various buyers can see the information and participate in the discount activity.

Figure 8:
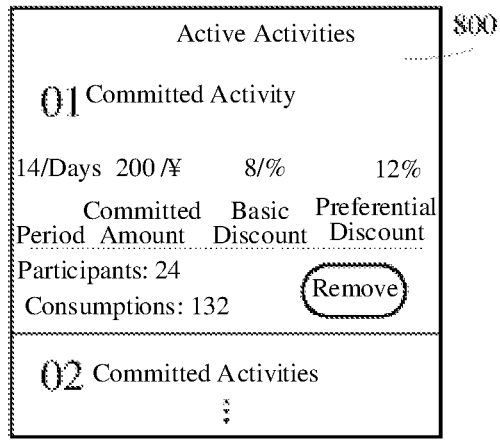
FIG. 8 is a schematic diagram of a created discount activity in accordance with an exemplary embodiment.

FIG. 8 is a schematic diagram illustrating a created discount activity in accordance with an exemplary embodiment. As shown in FIG. 8, the merchant may view and manage various discount activities that have been created in an activity presentation interface 800. For example, a "01 Committed Activity" presented in the activity presentation interface 800 may be a discount activity recently created by the merchant. The discount activity has a "activity period" of 14 days, a "committed consumption amount" of 200 Yuan, a "basic discount" of 8% and a "preferential discount" of 12%. While not described in detail herein, other discount activities such as the one shown as "02 Committed Activity" may also be presented in the activity presentation interface 800. The merchant may remove "01 Committed Discount Activity" by activating a corresponding "Remove" option to make buyers unable to see the information or participate in the activity any longer. While not described in further detail herein, the merchant may also edit any created discount activity in order to make changes in its "activity period", "committed consumption amount", "basic discount", "preferential discount", etc.

Figure 9:
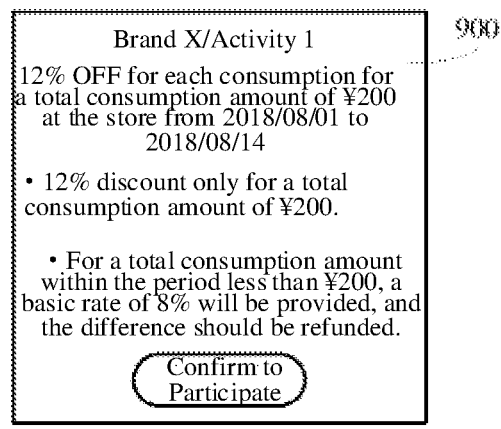
FIG. 9 is a schematic diagram of showing activity content to a buyer in accordance with an exemplary embodiment.

FIG. 9 is a schematic diagram showing activity content to buyers in accordance with an exemplary embodiment. As shown in FIG. 9, the buyer may view information on the activity in an activity presentation interface 900 on the transaction platform. The activity presentation interface 900 can be used for the merchant to present a discount activity created using the activity creation interface 700 to a buyer, so that the buyer can fully understand the discount activity and know benefits and obligations that he/she can obtain when participating. Such benefits may include, for example, a "preferential discount of 12%", whereas such obligations may include, for example, "an accumulated consumption amount at the store not less than 200 Yuan within the period from Aug. 1, 2018 to Aug. 14, 2018" and "a refund for the difference generated between the preferential and basic (8%) discount in the situation of a consumption amount within the period not reaching 200 Yuan". For any discount activity, a buyer may submit an application for participation by activating a corresponding "Confirm to Participate" option in the activity presentation interface 900.

Figure 10:
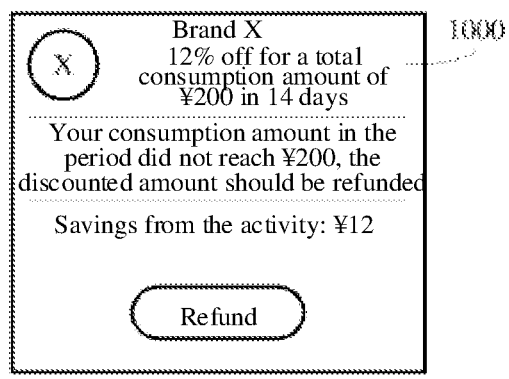
FIG. 10 is a schematic diagram of notifying a buyer to refund a difference according to an exemplary embodiment.

FIG. 10 schematically illustrates a notification requiring a buyer to refund a difference according to an exemplary embodiment. When an actual consumption amount of a buyer who has participated in a discount activity within an activity period does not reaches a committed consumption amount, a refund notification is sent from the transaction platform to the buyer, and may be displayed in the notification display interface 1000 as shown in FIG. 10. The refund notification may inform the buyer of the information about the discount activity that he/she has participated in, the reason for the refund, an amount that has been discounted, etc. The buyer may initiate the refund by activating a "Refund Discount" option in the notification display interface 1000.

Figure 11:
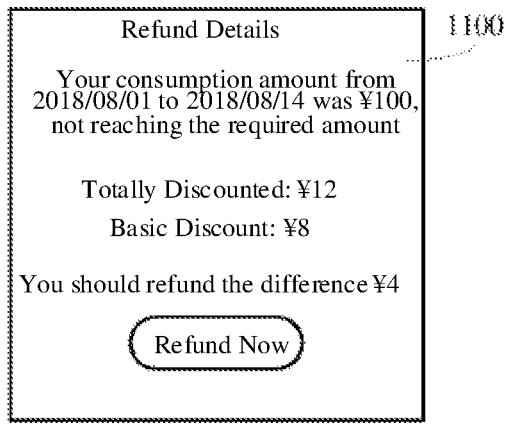
FIG. 11 is a schematic diagram illustrating a refund detailing interface according to an exemplary embodiment.

In one embodiment, once the buyer activates the "Refund Discount" option in the notification display interface 1000, he/she can navigate to a refund detailing interface 1100 as shown in FIG. 11, which shows the difference that the buyer shall actually refund. For example, assuming a total amount of 12 Yuan has been actually discounted for the buyer based on the preferential discount, while a basic discount amount is 8 Yuan, so the buyer should refund 4 Yuan to make up the difference. The buyer may pay the refund by activating a "Refund Now" option in the refund detailing interface 1100.

Figure 12:
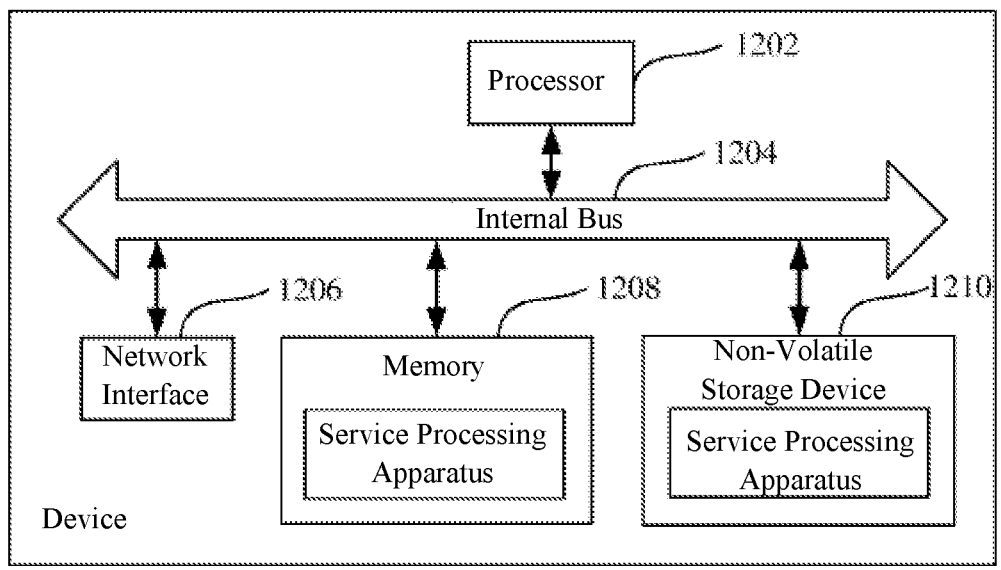
FIG. 12 is a schematic diagram illustrating the structure of an apparatus according to an exemplary embodiment.

FIG. 12 is a schematic structural diagram of an apparatus according to an exemplary embodiment. Referring to FIG. 12, the apparatus includes, at a hardware level, a processor 1202, an internal bus 1204, a network interface 1206, a memory 1208 and a non-volatile storage device 1210. It may also include other hardware necessary for service processing. The processor 1202 is configured to read a corresponding computer program from the non-volatile storage device 1210 into the memory 1208 and execute it so as to form, at a logical level, a device for processing a service. Apart from this software implementation, one or more embodiments described herein do not exclude other implementations, such as a logic device implementation, a combined software/hardware implementation and so forth. In other words, the processes described below are executable not only by the following various logical units but also by hardware or logic devices.

Figure 13:
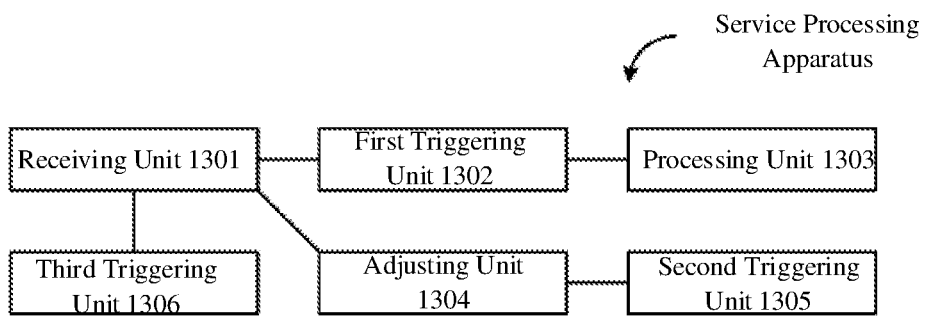
FIG. 13 is a block diagram of a device for processing a service according to an exemplary embodiment.

Referring to FIG. 13, in a software embodiment, the apparatus is applied to a service platform and may include:

a receiving unit 1301 for receiving an information sent from a user terminal, the information comprising: when a credit value of a first user corresponding to the user terminal reaches a predetermined value, if the first user makes a commitment to sending no less than a predetermined amount of resources to a second user within a predetermined period of time, then a ratio of an amount of resources sent by the first user to a standard amount of resources corresponding to a service object provided by the second user to the first user is defined as a first ratio a, where 0<a<1; and a first triggering unit 1302 for triggering a balance compensation process, if an actual amount of resources sent by the first user to the second user within the predetermined period of time is less than the predetermined amount, so that the first user sends a balance resource to the second user, by a deadline, wherein a ratio of an amount of the balance resources to the standard amount of resources is defined as a second ratio b, wherein 0<b≤1−a.

In one embodiment, the first triggering unit 1302 may be configured to:

send a notification to the first user; and/or automatically deduct and send the balance resource from a user resource pool corresponding to the first user to the second user.

In another embodiment, the apparatus may further include:

a processing unit 1303 for initiating a credit default process against the first user if the first user fails to send the balance resource to the second user by the deadline.

In yet another embodiment, the processing unit 1303 may be configured for at least one of:

lowering the credit value of the first user; restricting participation of the first user in services; and adding the first user to a credit blacklist.

In still another embodiment, the apparatus may further include:

an adjusting unit 1304 for decreasing a value of the first ratio a, if the first user has at least one associated user whose credit value reaches the predetermined value, and each of the first and associated users makes a commitment to sending to the second user no less than the predetermined amount of resources within the predetermined period of time.

In some embodiments, the apparatus may further include:

a second triggering unit 1305 for triggering an adjusted compensation process, if an actual amount of resources sent by the first user to the second user within the predetermined period of time is not less than the predetermined amount while an actual amount of resources sent by the at least one associated user to the second user within the predetermined period of time is less than the predetermined amount, so that the first user sends an adjusted resource to the second user, by the deadline. The amount of the adjusted resource to the standard amount of resources is defined as a third ratio c, and the third ratio c is equal to the decrease d value of the first ratio a.

In some other embodiments, the apparatus may further include:

a third triggering unit 1306 for triggering a refund process, if the first user has at least one associated user whose credit value reaches the predetermined value, and an actual amount of resources sent by each of the first and associated users to the second user within the predetermined period of time is not less than the predetermined amount, so that the second user sends a refund resource to the first user, wherein an amount of the refund resource to the standard amount of resources is defined as a fourth ratio d, where 0<d<a.

Figure 14:
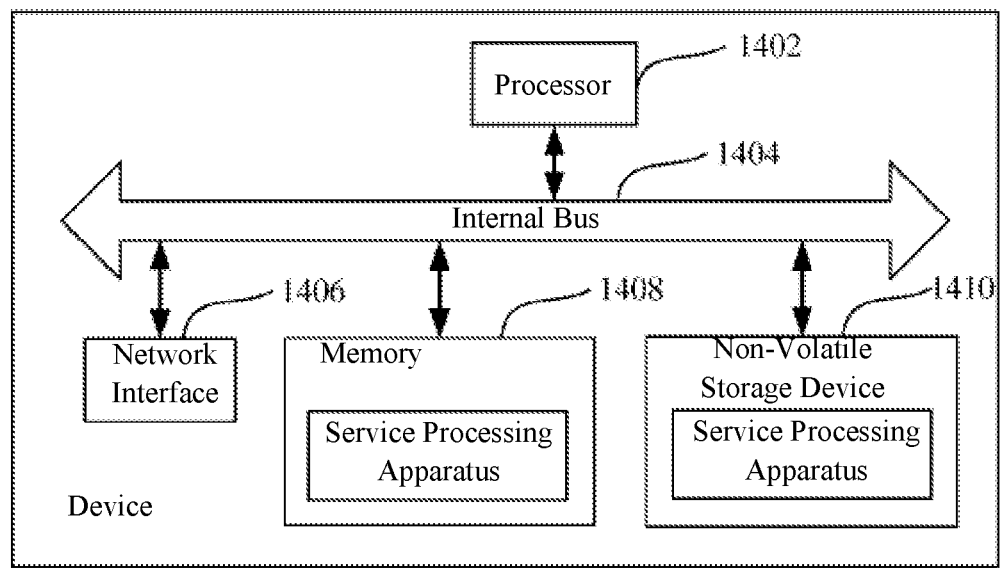
FIG. 14 is a schematic diagram illustrating the structure of another apparatus according to an exemplary embodiment.

FIG. 14 is a schematic structural diagram of an apparatus according to an exemplary embodiment. Referring to FIG. 14, the apparatus includes, at a hardware level, a processor 1402, an internal bus 1404, a network interface 1406, a memory 1408 and a non-volatile storage device 1410. It may also include other hardware necessary for service processing. The processor 1402 is configured to read a corresponding computer program from the non-volatile storage device 1410 into the memory 1408 and execute it so as to form, at a logical level, an apparatus for processing a service. Apart from this software implementation, one or more embodiments described herein do not exclude other implementations, such as a logic device implementation, a combined software/hardware implementation and so forth. In other words, the processes described below are executable not only by the following various logical units but also by hardware or logic devices.

Figure 15:
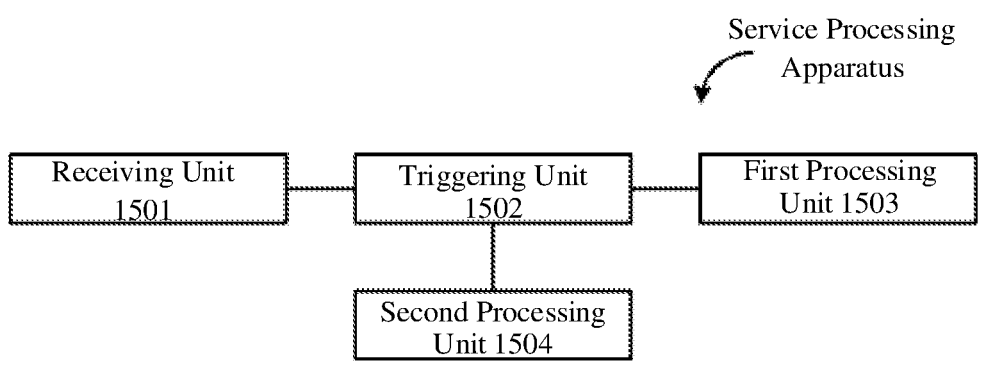
FIG. 15 is a block diagram of another device for processing a service according to an exemplary embodiment.

Referring to FIG. 15, in a software embodiment, the apparatus is applied to a service platform and may include:

a receiving unit 1501 for receiving an information sent from a user terminal, the information comprising: when a first user corresponding to the user terminal has at least one associated user, and credit value of each of the first and associated users reaches a predetermined value, if the first and associated users make commitments to send no less than a predetermined amount of total resources to the second user within a predetermined period of time, then a ratio of an amount of resources sent by the first user to a standard amount of resources corresponding to a service object provided by the second user to the first user is defined as a first ratio a, wherein 0<a<1; and a triggering unit 1502 for triggering a balance compensation process, if an actual total amount of resources sent by the first and associated users to the second user within the predetermined period of time is less than the predetermined amount, so that the first user sends a balance resource to the second user by a deadline, wherein a ratio of an amount of the balance resource to the standard amount of resources is defined as a second ratio b, where 0<b≤1−a.

In one embodiment, the apparatus may further include:

a first processing unit 1503 for initiating a credit default process against the first user, if the first user fails to send the balance resource to the second user by the deadline.

In another embodiment, the apparatus may further include:

a second processing unit 1504 for initiating a credit default process against the first and associated users, if the first user fails to send the balance resource to the second user by the deadline.

Specifically, the systems, apparatus, modules or units explained in the foregoing embodiments may be implemented by computer chips or entities, or by products with certain functions. A typical implementation is a computer, which may be, in particular, in the form of a personal computer (PC), a laptop, a cell phone, a camera phone, a smart phone, an individual digital assistant, a media player, a navigation device, an email sending and receiving device, a game console, a tablet, a wearable device or any arbitrary combination thereof.

In a typical configuration, the computer incorporates one or more processors (CPU), input/output (I/O) interfaces, network interfaces and memories.

The memories may be in various forms including, among other computer-readable media, volatile memories, random access memories (RAMs) and/or non-volatile memories, such as read only memories (ROMs) or flash memories (flash RAMs). The memories are examples of computer-readable media.

Computer-readable media includes volatile and non-volatile, removable and non-removable media implemented in any method or technology for storage of information such as computer readable instructions, data structures, program modules or other data. Examples of computer storage media include, but are not limited to, phase-change random access memory (PRAM), static random access memory (SRAM), dynamic random access memory (DRAM) or other types of random-access memory (RAM); read-only memory (ROM); electrically erasable programmable read-only memory (EEPROM); flash memory or other memory technology; compact disk read-only memory (CD-ROM), digital versatile disks (DVD) or other optical storage; magnetic tape cassettes, magnetic disks, quantum memory, graphene-based storage media or other magnetic storage devices; or any other non-transitory medium that can be used to store information and be accessed by computing equipment. As used herein, computer-readable media do not include transitory computer-readable media such as modulated data signals and carrier waves.

It is to be also noted that the terms "comprise", "include" and any variations thereof are intended to cover a non-exclusive inclusion, such that a process, method, article, or apparatus that comprises a list of elements is not necessarily limited to those elements, but may include other elements not expressly listed or inherent to such process, method, article, or apparatus. An element preceded by "comprises a . . . " does not, without more constraints, preclude the existence of additional identical elements in the process, method, article, or apparatus that comprises the element.

While particular embodiments hereof have been described above, there are also other embodiments within the scope of the appended claims. In some cases, actions or steps recited in the claims may be carried out in a different order than in the embodiments while still achieving desirable results. In addition, the processes depicted in the accompanying drawings do not necessarily require the particular order shown, or sequential order, to achieve desirable results. In certain implementations, multitasking and parallel processing may be feasible or advantageous.

The terminology used in one or more embodiments described herein is merely for the purpose of illustrating particular embodiments and is not intended to limit one or more embodiments described herein. As used in one or more embodiments described herein, as well as in the claims, the singular forms "a", "an" and "the" are intended to include the plural forms as well, unless the context clearly indicates otherwise. It should be further understood that the term "and/or" as used herein includes any and all combinations of one or more of the associated listed items.

It should be understood that although the terms such as "first", "second", "third" and the like may be used in one or more embodiments described herein to describe various types of information, such information is not limited to these terms. These terms serve only to distinguish between information of the same type. For example, without departing from the scope of the present invention, "first information" may also be referred to as "second information". Similarly, "second information" may also be referred to as "first information". Depending on the context, the term "if" as used herein may be interpreted as "when", "upon" or "in response to determine . . . ".

Presented above are merely preferred implementations of one or more embodiments described herein, which, however, do not limit the one or more embodiments described herein in any sense. Any and all changes, equivalent alternatives, modifications and the like made without departing from the spirit and principles of the one or more embodiments described herein are all intended to be embraced within the scope of the one or more embodiments described herein.

What is claimed is:

1. A computer-implemented method for sharing network data and prioritizing uplink and downlink bandwidths, comprising:
   receiving, by a computer device of a service platform, a request from a user terminal of a first user, the request comprising a commitment that the first user will send no less than a predetermined amount of first network data to a second user within a predetermined period of time to obtain second network data from the second user wherein a ratio of an amount of the first network data sent by the first user to a standard amount of the first network data corresponding to the second network data is a first ratio a, and $0<a<1$;
   verifying, by the computer device of the service platform, a credit value of the first user;
   in response to the credit value reaching a predetermined credit value, accepting, by the computer device of the service platform, the request of the first user and allocating bandwidths for the first user to downlink network data transfer with a higher priority than uplink network data transfer;
   receiving, by the computer device of the service platform, an authentication request comprising a first identifier of the first user from the second user;
   automatically calculating, by the computer device of the service platform, according to the first identifier, an actual amount of the first network data required for the first user to obtain the second network data at the first ratio a;
   in response to the first user sending the actual amount of the first network data to the second user for obtaining the second network data, verifying, by the computer device of the service platform, whether the first user fulfills the commitment; and
   in response to the first user failing to fulfill the commitment, triggering, by the computer device of the service platform, a balance compensation process to cause the first user to send a balance network data to the second user by a deadline, wherein a ratio of an amount of the balance network data to the standard amount of the first network data is a second ratio b, and $0<b\leq 1-a$.

2. The method of claim 1, wherein triggering a balance compensation process comprises:
   sending a notification to the first user; and
   deducting the balance network data from a user resource pool corresponding to the first user and sending the balance network data to the second user.

3. The method of claim 1, further comprising:
   in response to the first user failing to send the balance network data to the second user by the deadline, initiating a credit default process against the first user.

4. The method of claim 1, wherein the first user has at least one associated user whose credit value reaches the predetermined credit value, the at least one associated user makes the same commitment, and the method further comprises:
   decreasing a value of the first ratio a; and
   in response to the first user fulfilling the commitment and the at least one associated user failing to fulfill the commitment, triggering an adjusted compensation process, to cause the first user to send an adjusted network data to the second user at a third ratio c by a second deadline, wherein the third ratio c is a ratio of an amount of the adjusted network data to the standard amount of the first network data, and a value of the third ratio c is equal to the decreased value of the first ratio a.

5. The method according to claim 1, wherein the first user has at least one associated user whose credit value reaches the predetermined credit value, the at least one associated user makes the same commitment, and the method further comprises:
in response to both the first user and the at least one associated user fulfilling the commitment, triggering a refund process, to cause the second user to send a refund network data to the first user at a fourth ratio d, wherein the fourth ratio d is a ratio of an amount of the refund network data to the standard amount of the first network data, and $0<d<a$.

6. The method of claim 1, wherein the first user has at least one associated user whose credit value reaches the predetermined credit value, the at least one associated user makes the same commitment, and the method further comprises:
in response to the first user and the at least one associated user sending a total amount of network data no less than the predetermined amount of the first network data to the second user within the predetermined period of time, determining the ratio of the amount of network data sent by the first user to the standard amount of the first network data corresponding to the second network data provided by the second user as the first ratio a.

7. An apparatus for sharing network data and prioritizing uplink and downlink bandwidths, comprising one or more processors and a non-transitory computer-readable memory coupled to the one or more processors and configured with instructions executable by the one or more processors to perform operations comprising:
receiving a request from a user terminal of a first user, the request comprising a commitment that the first user will send no less than a predetermined amount of first network data to a second user within a predetermined period of time to obtain second network data from the second user wherein a ratio of an amount of the first network data sent by the first user to a standard amount of the first network data corresponding to the second network data is a first ratio a, and $0<a<1$;
verifying a credit value of the first user;
in response to the credit value reaching a predetermined credit value, accepting the request of the first user and allocating bandwidths for the first user to downlink network data transfer with a higher priority than uplink network data transfer;
receiving an authentication request comprising a first identifier of the first user from the second user;
automatically calculating, according to the first identifier, an actual amount of the first network data required for the first user to obtain the second network data at the first ratio a;
in response to the first user sending the actual amount of the first network data to the second user for obtaining the second network data, verifying whether the first user fulfills the commitment; and
in response to the first user failing to fulfill the commitment, triggering a balance compensation process to cause the first user to send a balance network data to the second user by a deadline, wherein a ratio of an amount of the balance network data to the standard amount of the first network data is a second ratio b, and $0<b\le1-a$.

8. The apparatus of claim 7, wherein triggering a balance compensation process comprises:
sending a notification to the first user; and
deducting the balance network data from a user resource pool corresponding to the first user and sending the balance network data to the second user.

9. The apparatus of claim 7, wherein the operations further comprise:
in response to the first user failing to send the balance network data to the second user by the deadline, initiating a credit default process against the first user.

10. The apparatus of claim 7, wherein the first user has at least one associated user whose credit value reaches the predetermined credit value, the at least one associated user makes the same commitment, and the operations further comprise:
decreasing a value of the first ratio a; and
in response to the first user fulfilling the commitment and the at least one associated user failing to fulfill the commitment, triggering an adjusted compensation process, to cause the first user to send an adjusted network data to the second user at a third ratio c by a second deadline, wherein the third ratio c is a ratio of an amount of the adjusted network data to the standard amount of the first network data, and a value of the third ratio c is equal to the decreased value of the first ratio a.

11. The apparatus of claim 7, wherein the first user has at least one associated user whose credit value reaches the predetermined credit value, the at least one associated user makes the same commitment, and the operations further comprise:
in response to both the first user and the at least one associated user fulfilling the commitment, triggering a refund process, to cause the second user to send a refund network data to the first user at a fourth ratio d, wherein the fourth ratio d is a ratio of an amount of the refund network data to the standard amount of the first network data, and $0<d<a$.

12. The apparatus of claim 7, wherein the first user has at least one associated user whose credit value reaches the predetermined credit value, the at least one associated user makes the same commitment, and the operations further comprise:
in response to the first user and the at least one associated user sending a total amount of network data no less than the predetermined amount of the first network data to the second user within the predetermined period of time, determining the ratio of the amount of network data sent by the first user to the standard amount of the first network data corresponding to the second network data provided by the second user as the first ratio a.

13. A non-transitory computer-readable storage medium for sharing network data and prioritizing uplink and downlink bandwidths, storing instructions executable by one or more processors to cause the one or more processors to perform operations comprising:
receiving a request from a user terminal of a first user, the request comprising a commitment that the first user will send no less than a predetermined amount of first network data to a second user within a predetermined period of time to obtain second network data from the second user wherein a ratio of an amount of the first network data sent by the first user to a standard amount of the first network data corresponding to the second network data is a first ratio a, and $0<a<1$;
verifying a credit value of the first user;
in response to the credit value reaching a predetermined credit value, accepting the request of the first user and allocating bandwidths for the first user to downlink network data transfer with a higher priority than uplink network data transfer;

receiving an authentication request comprising a first identifier of the first user from the second user;

automatically calculating, according to the first identifier, an actual amount of the first network data required for the first user to obtain the second network data at the first ratio a;

in response to the first user sending the actual amount of the first network data to the second user for obtaining the second network data, verifying whether the first user fulfills the commitment; and in response to the first user failing to fulfill the commitment, triggering a balance compensation process to cause the first user to send a balance network data to the second user by a deadline, wherein a ratio of an amount of the balance network data to the standard amount of the first network data is a second ratio b, and $0 < b \leq 1-a$.

14. The non-transitory computer-readable storage medium of claim 13, wherein triggering a balance compensation process comprises:

sending a notification to the first user; and deducting the balance network data from a user resource pool corresponding to the first user and sending the balance network data to the second user.

15. The non-transitory computer-readable storage medium of claim 13, wherein the operations further comprise:

in response to the first user failing to send the balance network data to the second user by the deadline, initiating a credit default process against the first user.

16. The non-transitory computer-readable storage medium of claim 13, wherein the first user has at least one associated user whose credit value reaches the predetermined credit value, the at least one associated user makes the same commitment, and the operations further comprise:

decreasing a value of the first ratio a; and in response to the first user fulfilling the commitment and the at least one associated user failing to fulfill the commitment, triggering an adjusted compensation process, to cause the first user to send an adjusted network data to the second user at a third ratio c by a second deadline, wherein the third ratio c is a ratio of an amount of the adjusted network data to the standard amount of the first network data, and a value of the third ratio c is equal to the decreased value of the first ratio a.

17. The non-transitory computer-readable storage medium of claim 13, wherein the first user has at least one associated user whose credit value reaches the predetermined credit value, the at least one associated user makes the same commitment, and the operations further comprise:

in response to both the first user and the at least one associated user fulfilling the commitment, triggering a refund process, to cause the second user to send a refund network data to the first user at a fourth ratio d, wherein the fourth ratio d is a ratio of an amount of the refund network data to the standard amount of the first network data, and $0 < d < a$.

18. The non-transitory computer-readable storage medium of claim 13, wherein the first user has at least one associated user whose credit value reaches the predetermined credit value, the at least one associated user makes the same commitment, and the operations further comprise:

in response to the first user and the at least one associated user sending a total amount of network data no less than the predetermined amount of the first network data to the second user within the predetermined period of time, determining the ratio of the amount of network data sent by the first user to the standard amount of the first network data corresponding to the second network data provided by the second user as the first ratio a.

* * * * *